United States Patent [19]

Sawa et al.

[11] Patent Number: 5,437,053
[45] Date of Patent: Jul. 25, 1995

[54] RADIO TELECOMMUNICATION APPARATUS

[75] Inventors: Buntaro Sawa; Kuniyoshi Marui, Saitama; Katsumi Shitara; Shinji Takachi, both of Tokyo, all of Japan

[73] Assignee: Kabushiki Kaisha Toshiba, Kawasaki, Japan

[21] Appl. No.: 10,199

[22] Filed: Jan. 28, 1993

[30] Foreign Application Priority Data

Jan. 29, 1992 [JP] Japan .................. 4-014294
Mar. 31, 1992 [JP] Japan .................. 4-077981

[51] Int. Cl.$^6$ .............. H04B 1/16; H04B 7/26; H04M 11/00; H04Q 7/38
[52] U.S. Cl. .................. 455/33.1; 455/54.1; 455/89; 379/59; 379/100
[58] Field of Search .............. 455/38.1, 38.4, 33.1, 455/54.1, 56.1, 66, 70, 89, 228; 379/59, 60, 101

[56] References Cited

U.S. PATENT DOCUMENTS

| | | | |
|---|---|---|---|
| 4,578,540 | 3/1986 | Borg et al. .............. | 379/101 |
| 4,677,653 | 6/1987 | Weiner et al. .......... | 379/58 |
| 4,734,928 | 3/1988 | Weiner et al. .......... | 379/59 |
| 4,742,560 | 5/1988 | Arai ...................... | 455/33.1 |
| 4,972,355 | 11/1990 | Mullins .................. | 379/59 |
| 5,029,233 | 7/1991 | Metroka ............... | 455/33.1 |
| 5,101,500 | 3/1992 | Marui .................... | 455/33.1 |
| 5,220,681 | 6/1993 | Belgin ................... | 455/38.4 |

FOREIGN PATENT DOCUMENTS

| | | |
|---|---|---|
| 0332825 | 9/1989 | European Pat. Off. . |
| 0344989 | 12/1989 | European Pat. Off. . |
| 0435052 | 7/1991 | European Pat. Off. . |
| 0526981 | 2/1993 | European Pat. Off. . |
| 2172775 | 9/1986 | United Kingdom . |
| 91/01067 | 1/1991 | WIPO . |

Primary Examiner—Edward F. Urban
Assistant Examiner—Mark D. Wisler
Attorney, Agent, or Firm—Banner & Allegretti, Ltd.

[57] ABSTRACT

An apparatus stores a plurality of mobile identification numbers. When a user selects at least one of the stored mobile identification number and the apparatus receives a mobile identification number transmitted from a base unit, the received mobile identification number is compared to each selected mobile identification number. When the user does not select any of the stored mobile identification numbers and the apparatus receives a mobile identification number transmitted from the base unit, the received mobile identification number is compared to each of the stored mobile identification numbers. When the received mobile identification number coincides with one of the selected mobile identification number or one of the stored mobile identification numbers, the apparatus is enabled to communicate with the base unit.

31 Claims, 21 Drawing Sheets

Fig. 5

| | ID ROM | |
|---|---|---|
| ADDRES | SERIAL NUMBER | MOBILE IDENTIFICATION NUMBER | PRIORITY FLAG |
| FF00 | SER No.100 | MID 1 | 1 |
| FF01 | SER No.100 | MID 2 | 0 |
| FF02 | SER No.100 | MID 3 | 0 |

Fig. 6

| NAM | | | |
|---|---|---|---|
| NAM 1 | | NAM 2 | |
| SERIAL No. | MOBILE IDENTIFICATION NUMBER | SERIAL No. | MOBILE IDENTIFICATION NUMBER |
| SER No.100 | MID 1 | SER No.100 | MID 3 |
| SER No.100 | MID 2 | | |
| SER No.100 | MID 3 | | |

RADIO TELECOMMUNICATION APPARATUS

FIELD OF THE INVENTION

The present invention relates to a radio telecommunication apparatus used in a radio telecommunication system, such as a motor vehicle radio telephone system or a portable radio telephone system, and more particularly to a radio telecommunication apparatus having a plurality of mobile identification numbers that controls calls by way of the mobile identification numbers.

DESCRIPTION OF THE RELATED ART

FIG. 1 is a diagram illustrating a cellular radio telephone system. A service area #1 is covered by a plurality of cells 101. A base station 102 is provided for each cell 101. Mobile telephone switching offices (MTSO) 103, 123 are provided for each service area #1, #2 and connected to a plurality of base stations 102 and a landline. Mobile units 110, 120 communicate with the base station 102 of the cell 101 within which the mobile unit is located.

In the conventional system, a mobile identification number (MID) is provided for a mobile unit in a service area. Therefore, a user uses only one MID in the service area and has to communicate with another party by way of only one MID regardless of public usage or private usage.

If it is assumed that a company is registered as the user, the company has to pay a user fee for not only public use but also private use of the MID.

Further, in accordance with a cellular mobile system in the U.S., for example AMPS, there is a service in which a called party has to pay a user fee. In this system, therefore, the user has to pay the user fee for unwanted incoming calls.

SUMMARY OF THE INVENTION

It is accordingly an object of the present invention to provide radio telecommunication apparatus having a plurality of MIDs.

It is a further object of the present invention to provide a telecommunication apparatus that enables the user to select a MID from stored MIDs in the apparatus and to receive only predetermined incoming calls. Therefore it is possible for the user to use the apparatus for public use or for private use.

It is a still a further object of the present invention to provide an improved radio telecommunication apparatus that enables the user to divide a charge between user fees for public use and for private use.

According to a preferred embodiment of the invention, an apparatus stores a plurality of MIDs. When a user selects at least one of the stored MIDs and the apparatus receives a MID transmitted from a base unit, the received MID is compared to each of the selected MIDs. When the user does not select any of the stored MIDs, the apparatus informs a user that the user should input instruction information necessary for selecting at least one of the stored MIDs. When the received MID coincides with a selected MID, the apparatus is enabled to communicate with the base unit.

According to another preferred embodiment of the invention, an apparatus stores a plurality of MIDs. When a user selects one of the stored MIDs and inputs a call origination request, the selected MID is sent to a base unit. When the user does not select any of the stored MIDs and inputs a call origination request, the apparatus informs a user that the user should input instruction information necessary for selecting one of the stored MIDs.

BRIEF DESCRIPTION OF THE DRAWINGS

FIG. 5 is a chart illustrating the content of ID ROM 370 shown in FIGS. 3 and 4.

FIG. 6 is a chart illustrating the content of RAM 335 shown in FIG. 4.

DETAILED DESCRIPTION OF THE PREFERRED EMBODIMENT

A preferred embodiment of the present invention applied in a mobile telephone will be described with reference to the accompanying drawings.

Figure 1:
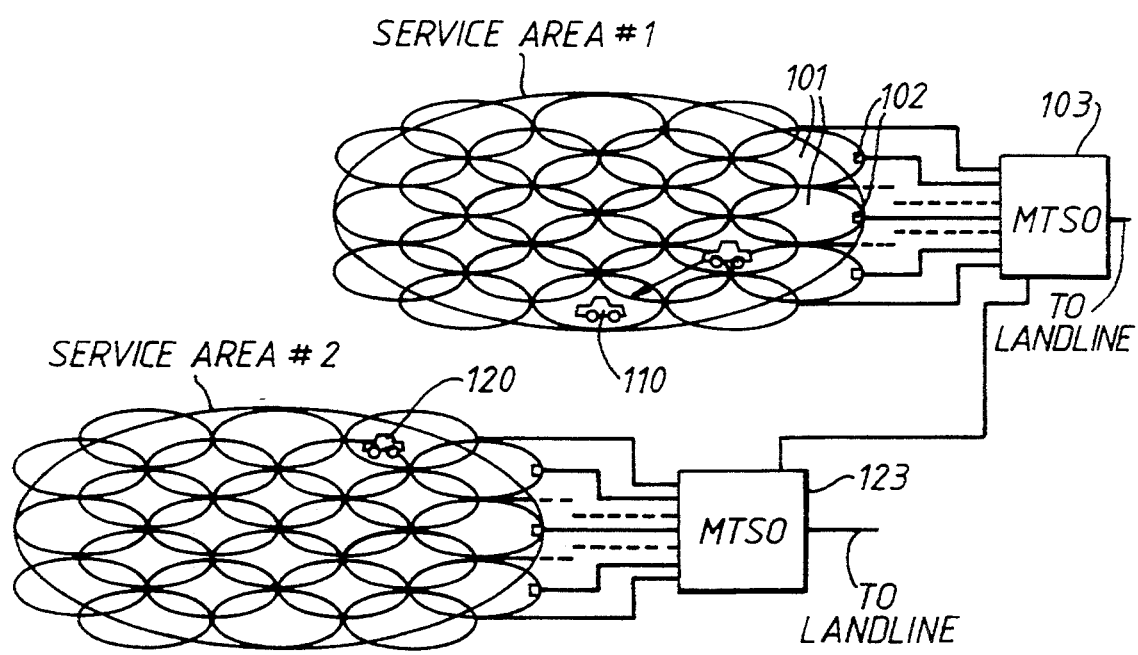
FIG. 1 is a block diagram illustrating a cellular radio telephone system.
Figure 2:
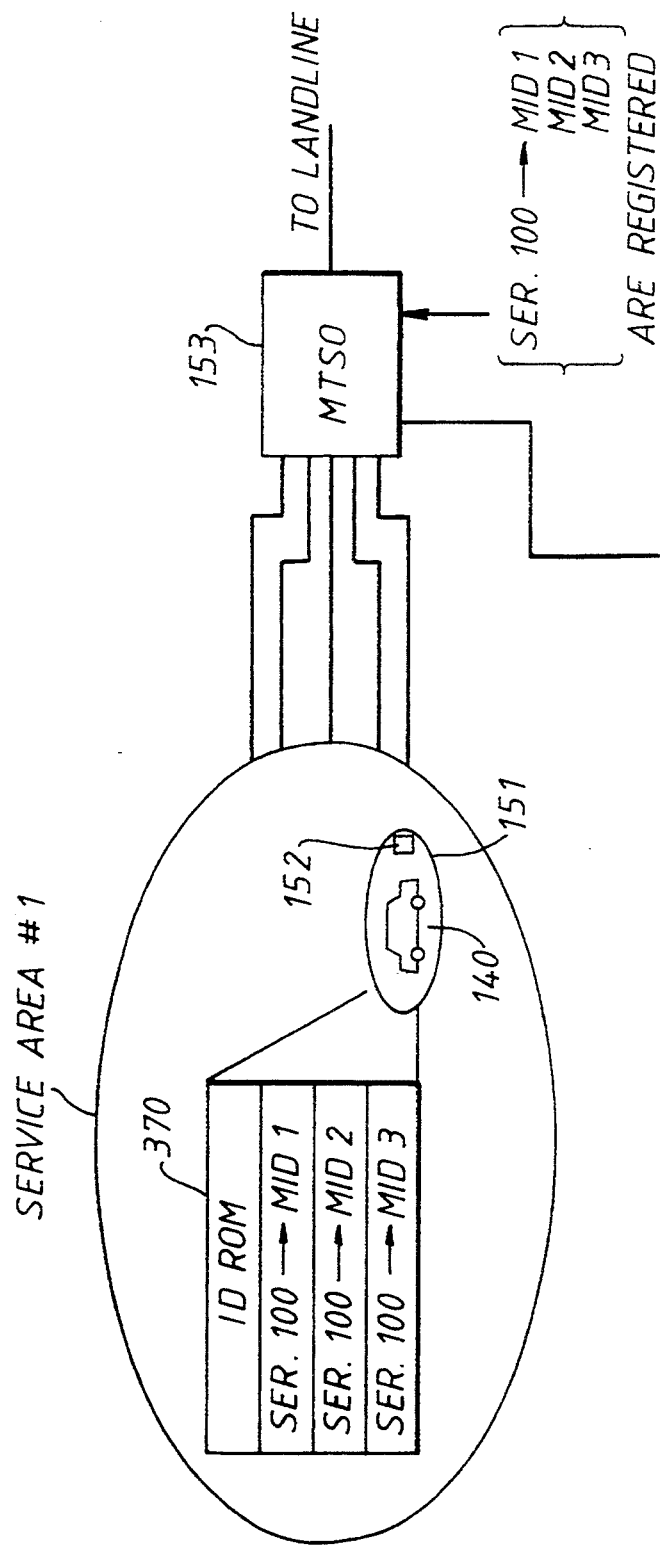
FIG. 2 is a block diagram illustrating a cellular radio telephone system of the present invention.

Referring to FIG. 2, a mobile unit 140 is located within a cell 151 including a base station 152. Mobile unit 140 includes a mobile telephone apparatus. By way of example, three mobile identification numbers MID 1-3 (which are identification numbers for the mobile telephone apparatus) are stored with a serial number SER. 100 in an ID ROM 370 of the mobile telephone apparatus. These MIDs 1-3 are also registered in MTSO 153.

Figure 3:
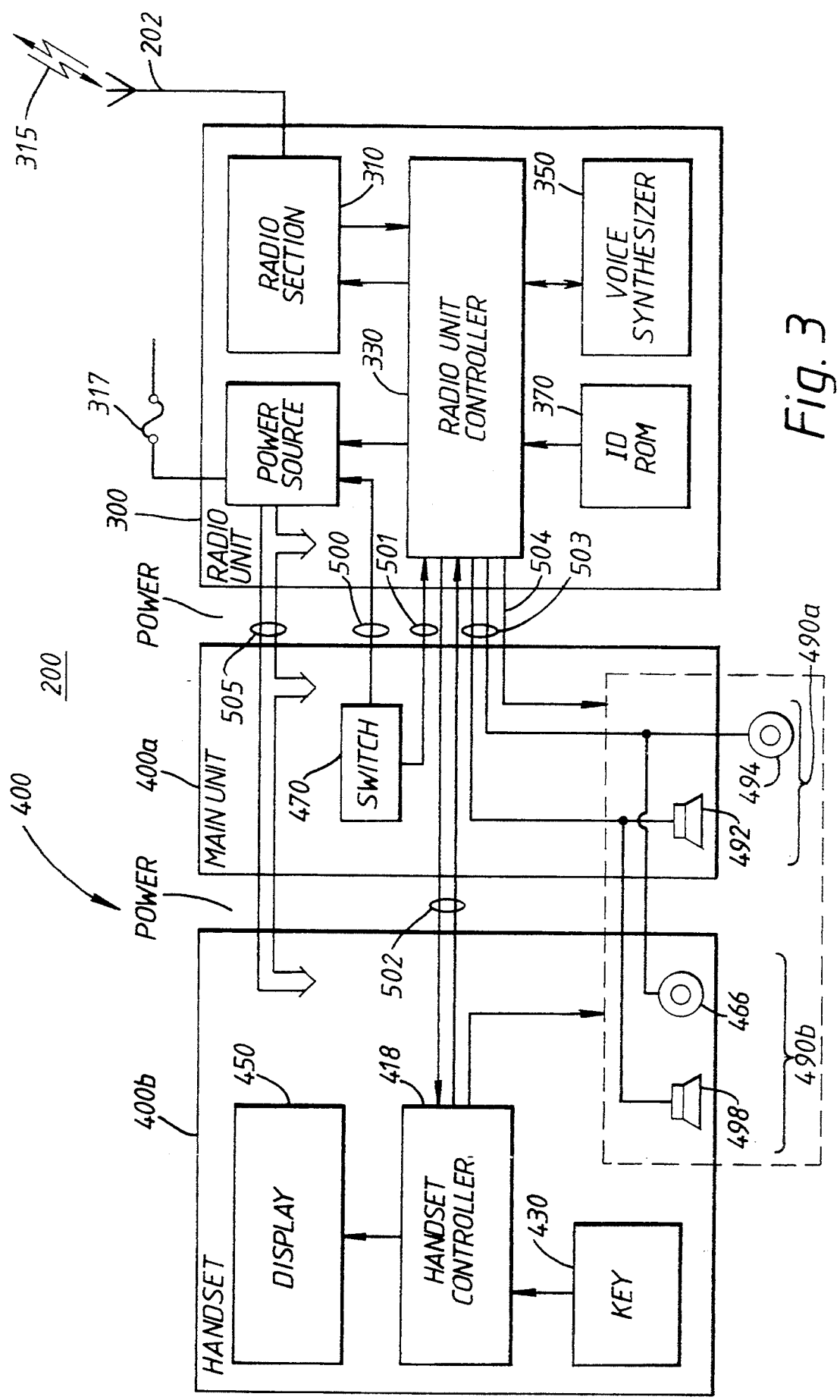
FIG. 3 is a block diagram illustrating an arrangement of a mobile telephone apparatus according to an embodiment of the present invention.

FIG. 3 is a block diagram showing an arrangement of the mobile telephone apparatus 200 according to an embodiment of the present invention. Referring to FIG. 3, mobile telephone apparatus 200 comprises an antenna 202, a radio unit 300 and a telephone unit 400. Antenna 200 is mounted on an outer body surface of an automobile. Telephone unit 400 is mounted near the driver's seat inside the automobile.

Radio unit 300 includes a radio section 310 for establishing radio channels 315 with a base station (not shown) through antenna 202 and for exchanging signals therewith, a radio unit controller 330 for controlling the overall operations of the apparatus, a voice synthesizer 350 for synthesizing voices, ID ROM 370 for storing MID 1–3 with the serial number, and a power source 390 for supplying power from the battery mounted in the automobile to the above components through fuse 317.

Telephone unit 400 includes a handset controller 418 for controlling the overall operations of telephone unit 400 in response to instructions or the like from radio unit controller 330, a key unit 430 for entering key inputs, a display unit 450 for displaying numerical or alphabetical characters in response to control signals from handset controller 418, switches 470 including a hook switch and a power switch, and selectable audio input/output units 490a and 490b for inputting or outputting an audible sound. Telephone unit 400 may be divided into main unit 400a and handset 400b. A microphone 494 may be a hands-free microphone mounted on a sun visor or the like near the driver's seat and is connected to main unit 400a. Loudspeaker 492 may be mounted in main unit 400a. Loudspeaker 492 and microphone 494 constitute audio input/output unit 490a of main unit 400a. Handset controller 418, key unit 430, and display unit 450 are mounted in handset 400b. A handset microphone 466 and a handset receiver 498 constitute audio input/output unit 490b of handset 400b.

Each section of radio unit 300, main unit 400a, and handset 400b is supplied power by way of a power line 505 extending from power source 390 in radio unit 300. The opened or closed status of switches 470 is transmitted to power source 390 or radio unit controller 330 by way of a line 500 or a line 501, respectively. Control and/or command signals are transmitted between handset controller 418 and radio unit controller 330 by way of lines 502. Audio signals are transmitted by way of lines 503. Radio unit controller 330 sends control signals to audio input/output unit 490a, 490b by way of lines 504.

Figure 4:
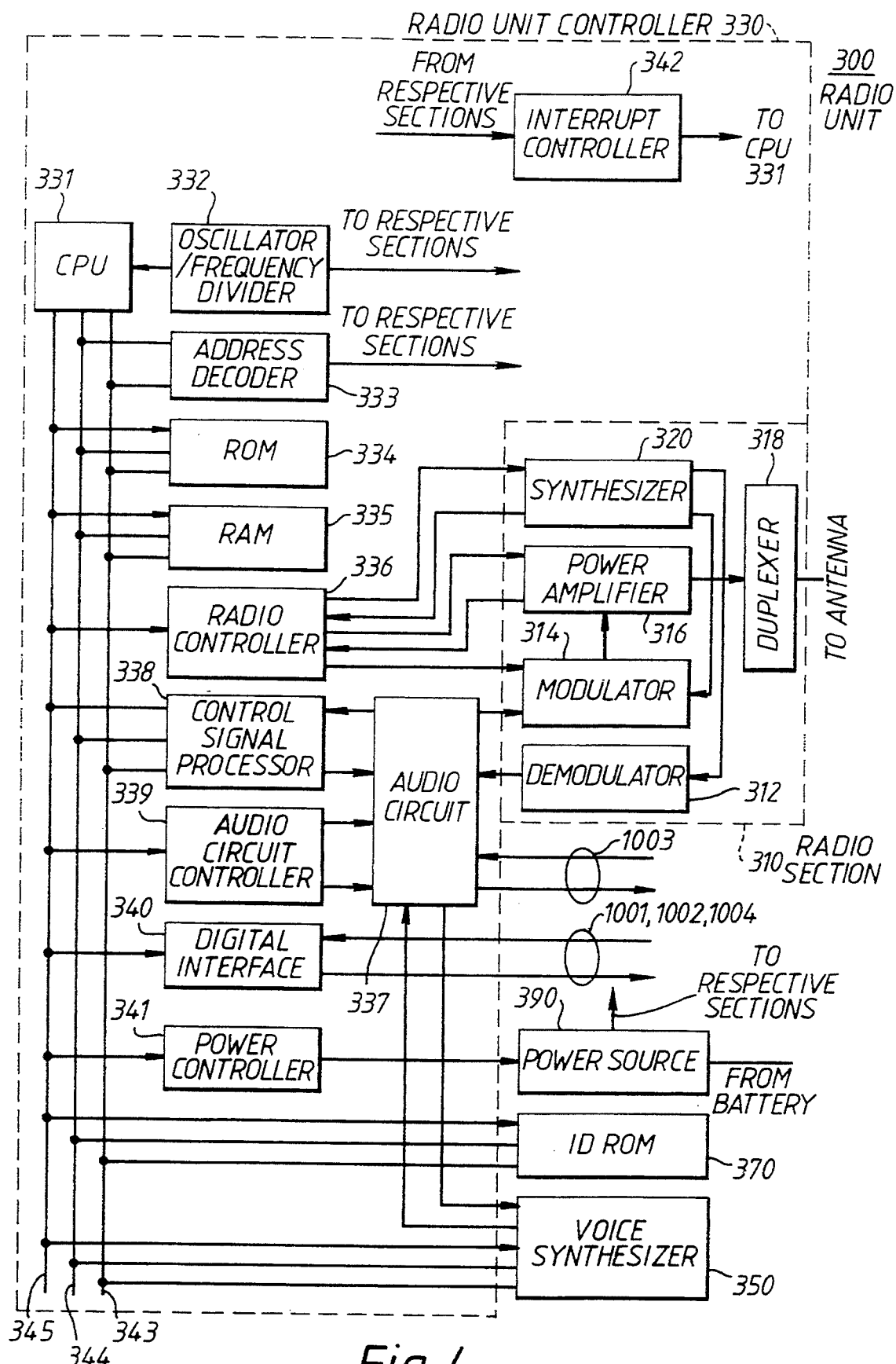
FIG. 4 is a block diagram of radio unit 300 shown in FIG. 3.

FIG. 4 is a block diagram showing a derailed arrangement of radio unit 300 of FIG. 3. Referring to FIG. 4, radio section 310 comprises a demodulator 312, a modulator 314 and a synthesizer 320. Demodulator 312 demodulates a radio signal received from the base station through radio channels 315, antenna 202 and duplexer 318. It should be noted that this radio signal includes audible sound signals and control signals. Modulator 314 modulates the audio and control signals received from an audio circuit 337 and generates the required transmission signals.

Power amplifier 316 amplifies the transmission signals received from modulator 314. The amplification by power amplifier 316 may be continuous or variable in a step-wise fashion, e.g., 8-step variable. Duplexer 318 sends the signals received through radio channel 315 to demodulator 312 and the signals from modulator 314 and power amplifier 316 to antenna 202. Synthesizer 320 includes a channel selection local oscillator and specifies a frequency from which signals are demodulated by demodulator 312 and a frequency to which signals are modulated by modulator 314. About 666 channels may be available from synthesizer 320.

Radio unit controller 330 includes a central processing unit (CPU) 331, an oscillator/frequency divider 332, an address decoder 333, a ROM 334, a RAM 335, a radio controller 336, audio circuit 337, a control signal processor 338, an audio circuit controller 339, a digital interface 340, a power controller 341 and an interrupt controller 342. Reference numerals 343, 344 and 345 denote a data bus, an address bus and a control bus, respectively. CPU 331 controls the operation of radio unit controller 330. Oscillator/frequency divider 332 supplies clock signals to CPU 331 and divides the clock signals to supply appropriate frequency-divided pulses as timing pulses to each section of the mobile telephone apparatus requiring them. Address decoder 333 outputs predetermined operation signals to the components in response to instruction signals from CPU 331. ROM 334 stores various programs required for operation of CPU 331. RAM 335 stores various types of data during processing for use by CPU 331. Radio controller 336 controls radio section 310 in response to instructions from CPU 331. For example, radio controller 336 sends signals indicative of available frequencies to synthesizer 320, signals indicative of an amplification level to power amplifier 316, and signals indicative of modulation parameters to modulator 314. Radio controller 336 receives a step-out signal from synthesizer 320 and output power detection signals from power amplifier 316, and forwards these signals to CPU 331 thereby preventing operational errors.

Audio circuit 337 extracts control signals and audio signals from the received signals demodulated by demodulator 312 and supplies the control signals to control signal processor 338 and the audio signals to telephone unit 400. Audio circuit 337 also supplies a control signal from control signal processor 338 and audio signals from telephone unit 400 to modulator 314. It should be noted that audio circuit 337 also arranges the waveform of the control signal to be sent to control signal processor 338 in a particular signal format and filters the control signal to be supplied to modulator 314. Control signal processor 338 performs bit and frame synchronization with the control signal from audio circuit 337. Maintaining the required synchronization, control signal processor 338 converts the serial control signals, including control data received from a base station, into parallel signals and converts the parallel control data signals to be transmitted to a base station into serial signals. The control signals are sent to and from the base station via audio circuit 337.

Audio circuit controller 339 controls audio circuit 337. Under the control of audio circuit controller 339, for example, audio circuit 337 applies the received signals from demodulator 312 to control signal processor 338 or telephone unit 400, and selectively receives the signals from control signal processor 338 or telephone unit 400. Digital interface 340 interfaces the data communication between radio unit 300 and telephone unit 400. Power controller 341 controls power source 390 and sets a voltage supplied from a battery 506 to power source 390 to a predetermined level. The voltage having the predetermined level is supplied to the respective circuit components.

FIG. 5 is a diagram which illustrates the contents of ID ROM 370 shown in FIGS. 3 and 4. In this embodiment, three mobile identification numbers MID1–3 (which are identification numbers for the mobile telephone) are stored with the serial number SER. No. 100 at predetermined addresses in ID ROM 370, i.e., FF00–FF02. However, the invention is not limited in this respect. For example, ID ROM 370 may be configured to accommodate any number of MIDs. The serial number is provided for the mobile telephone apparatus in the cellular system. Further, a priority flag corresponding to MID1 is at logic "1" and priority flags corresponding to MID2, 3 are at logic "0".

FIG. 6 is a diagram which illustrates the content of RAM 335. RAM 335 has an area which is called Number Assignment Module, NAM hereinafter. NAM1 is an area where specified MID1–3 are stored. As with ID ROM 370, RAM 335 may be configured to accommodate any number of MIDs. The apparatus is permitted to receive an incoming signal having one of these MIDs in NAM1. On the other hand, NAM2 is an area where only one specified MID3 is stored. The apparatus is permitted to perform call origination to another party by way of this specified MID3 in NAM2.

Figure 7:
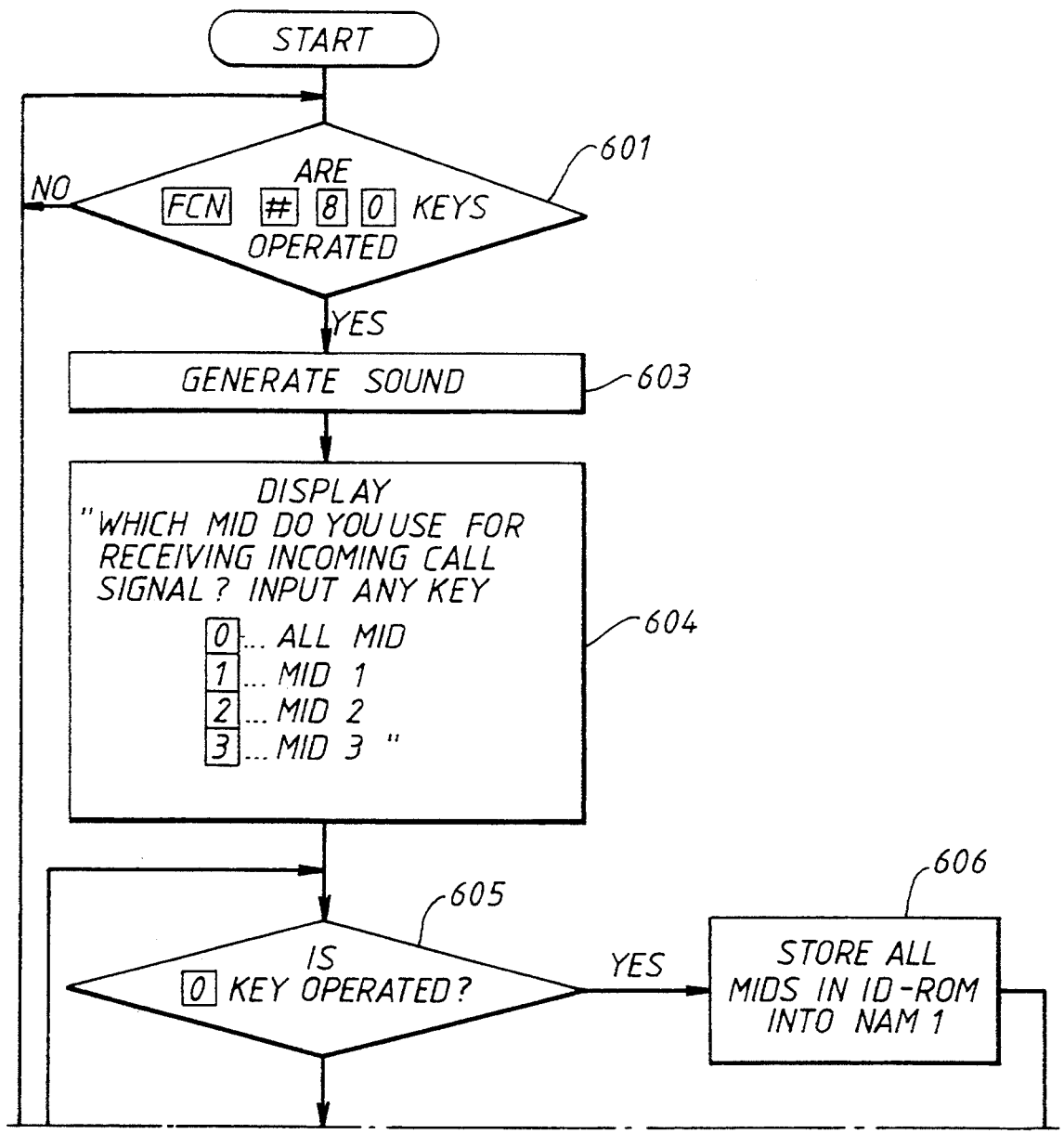
FIG. 7 is a flow chart illustrating a process for selecting a MID and for receiving an incoming call from MIDs stored in ID ROM 370.
Figure 7:
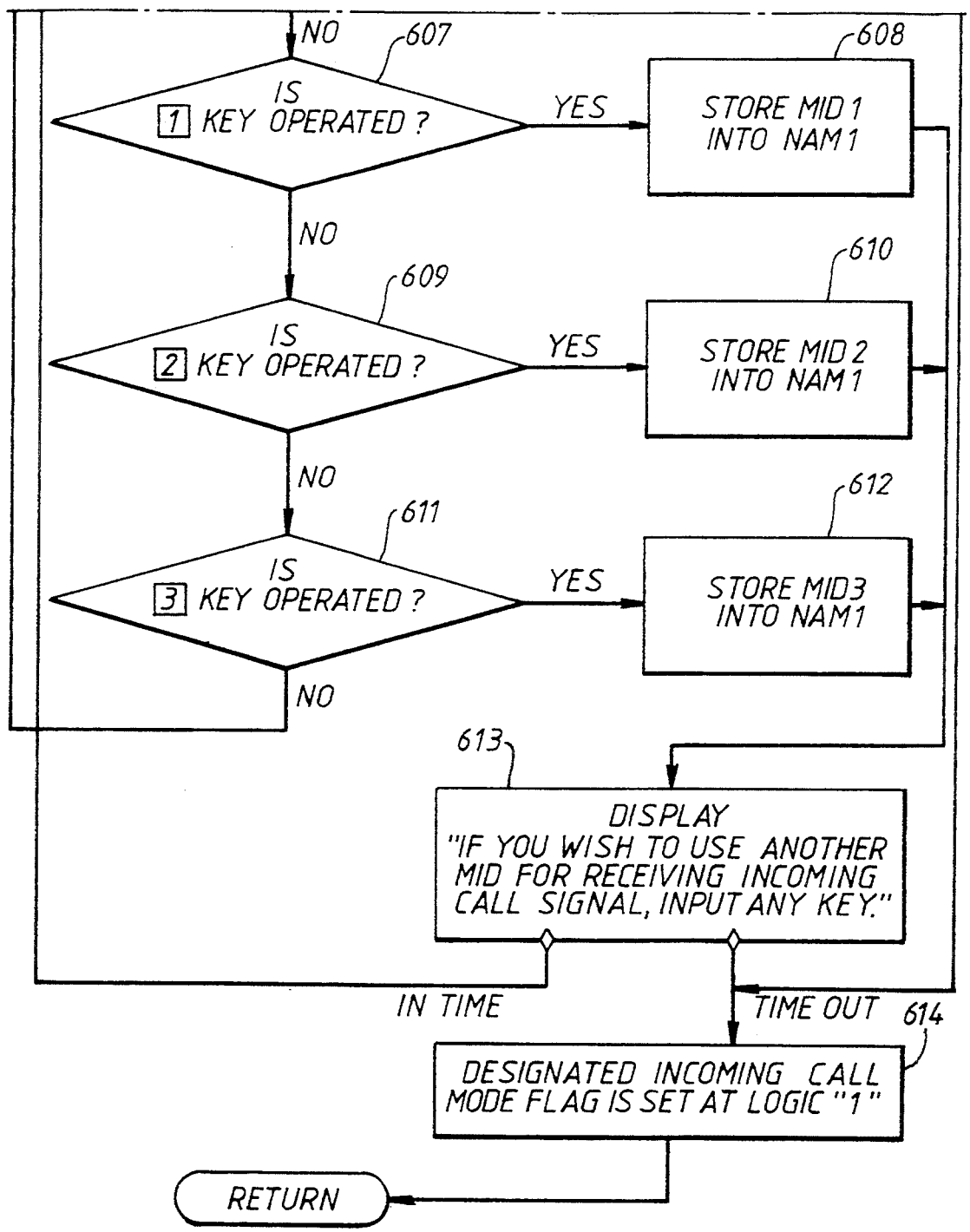

FIG. 7 is a flow chart which shows a process for storing into NAM 1 at least one of MID 1–3 for receiving an incoming call signal. To determine if the user wishes to designate one or more MIDs for receiving an incoming call signal, for example, "FCN", "#", "8", "0" key operations of the handset are checked (step 601). If these keys are operated, a beep sound is generated (step 603). Thereafter, in order to urge the user to input an instruction necessary for selecting at least one MID, a specific message may be displayed to the user. The displayed message may be, for example, "Which MID do you use for receiving incoming call signal? Input any key. "0" . . . all MID, "1" . . . MID1, "2" . . . MID2, "3" . . . MID3" (step 604). After this operation, "0" key operation is checked (step 605). When "0" key is operated, all MID1-3 into ID-ROM 370 are stored into NAM1 (step 606). When "1" key is operated, MID 1 is stored into NAM1 (step 607, step 608). When "2" key is operated, MID2 is stored into NAM1 (step 609, step 610). When "3" key is operated, MID3 is stored into NAM1 (step 611, step 612). If none of "0", "1", "2", "3" keys are operated, none of the MIDs is stored into NAM1.

After one of the MIDs is stored into NAM1, a specific message may be displayed. The displayed message may be, for example, "If you wish to use another MID for receiving incoming call signal, input any key." (step 613). Thereafter, if any key is operated during a predetermined period of time, MID corresponding to the operated key is stored in NAM1. If no key is operated during the predetermined period of time, a designated incoming call mode flag is set at logic "1" (step 614). When all MIDs are stored into NAM1 (step 606), the designated incoming call mode flag is set at log "1" (step 614).

Figure 8:
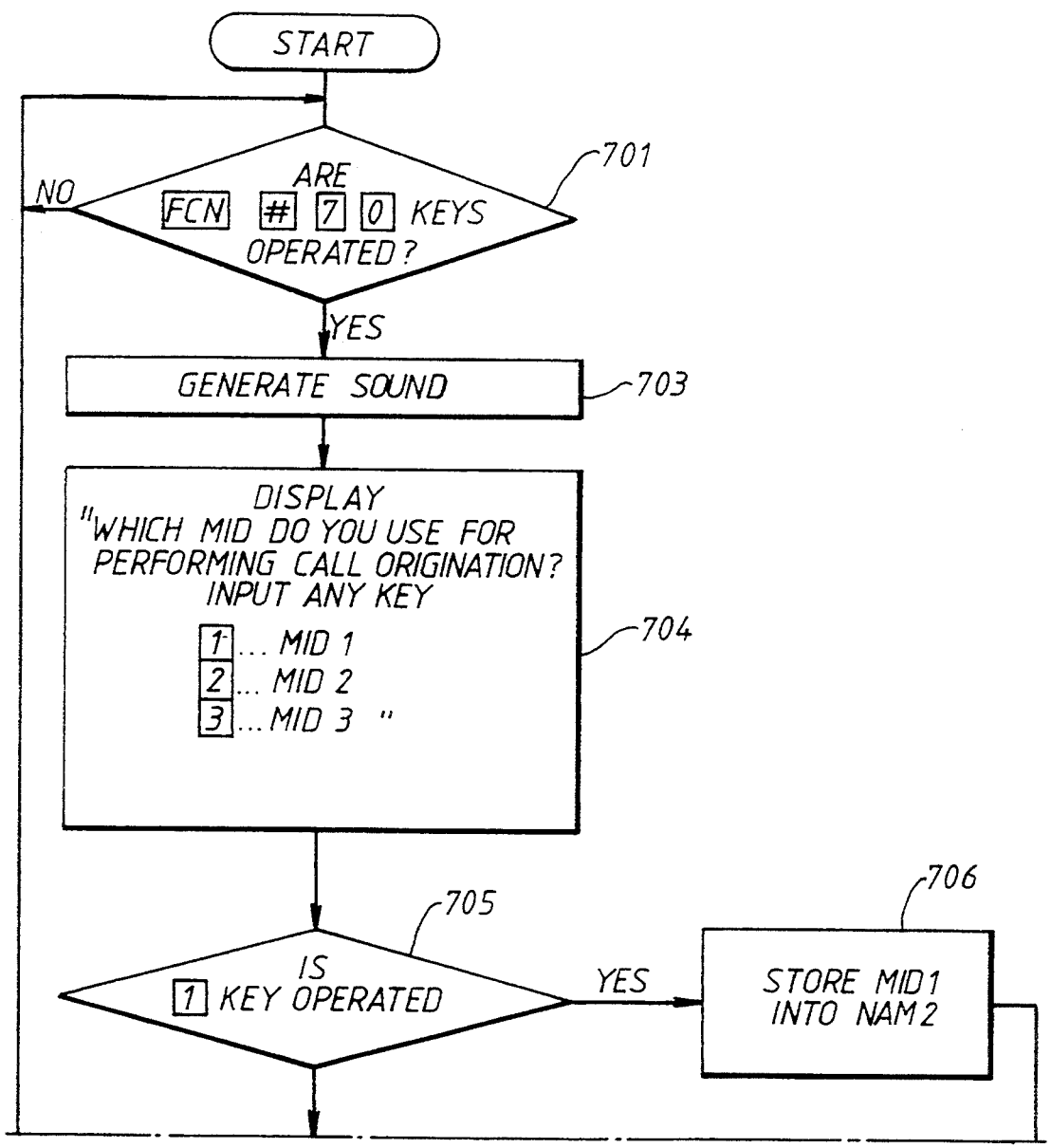
FIG. 8 is a flow chart illustrating a process for selecting a MID and for performing a call origination from MIDs stored in ID ROM 370.
Figure 8:
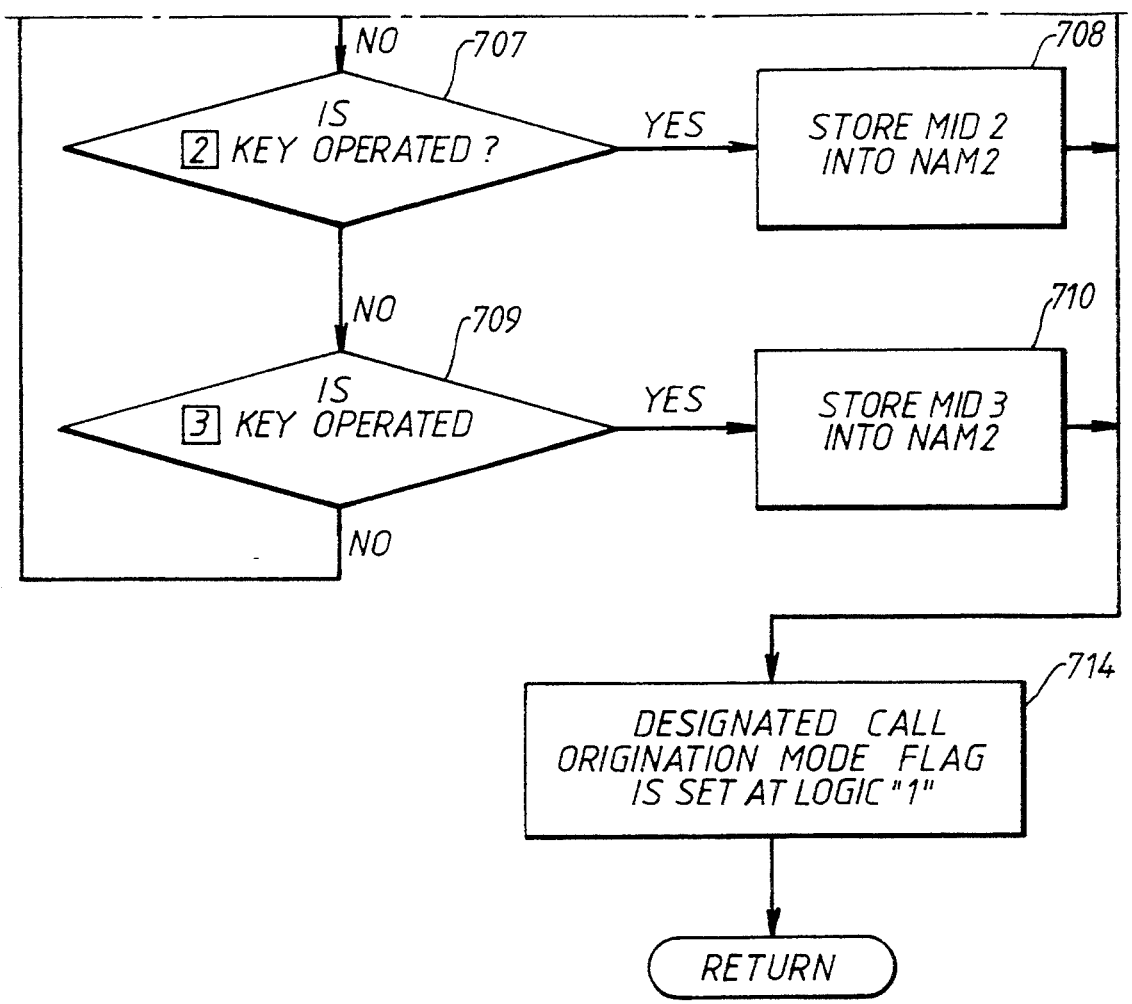

FIG. 8 is a flow chart which shows a process for storing one of MID 1–3 for performing a call origination into NAM2. The determine if the user wishes to designate one MID for performing a call origination, for example, "FCN", "#", "7", "0" key operations are checked (step 701). When these operations are checked, a beep sound is generated (step 703). Thereafter, in order to urge the user to input an instruction necessary for selecting a MID for performing a call origination, a specific message is displayed to the user. The displayed message may be, for example, "Which MID do you use for performing call origination? Input any key. "1" . . . MID1, "2" . . . MID2, "3" . . . MID3" step (704). After this operation, when "1" key is operated, MID1 is stored into NAM2 (step 705, step 706). When "2" key is operated, MID2 is stored into NAM2 (step 707, step 708). When "3" key is operated, MID3 is stored into NAM2 (step 709, step 710). If none of "1", "2", "3" keys are operated, none of MIDs is stored into NAM2. When any one of the MIDs is stored into NAM2, a designated call origination mode flag is set at logic "1" (step 714).

A connection control operation of mobile telephone apparatus 200 will now be described with reference to FIG. 9. When a power switch of the mobile telephone apparatus is turned on, a reset operation begins (step 801). This operation is illustrated with reference to FIG. 10.

In response to turning on a power switch, CPU 331 resets each section (step 850). After that, a condition of whether the apparatus is allowed to be used or not, is checked. This check is defined as a lock state check (step 852). As long as the lock state is not cancelled, another party is not allowed to operate the apparatus. In this state, "Lock" is displayed on the display 450 (step 854). In the event that the apparatus is not set to "Lock" state, "NO SVC" is displayed (step 856). "NO SVC" means that a communication service has not been started during the reset operation. After the reset operation, an initialization starts (step 802).

Figure 11:
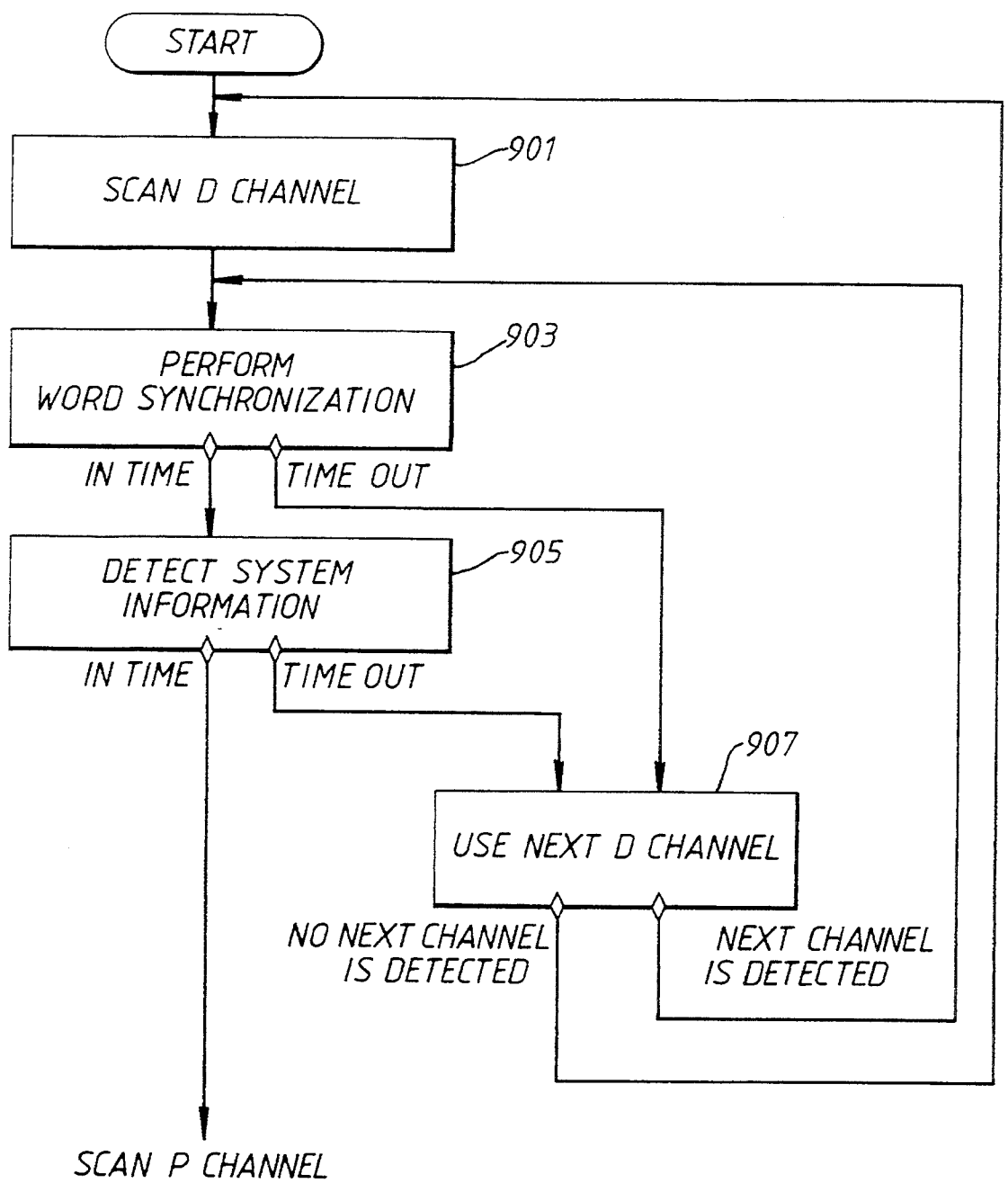
FIG. 11 is a flow chart illustrating an initialization operation step in the connection control operation of FIG. 9.

FIG. 11 is a detailed flow chart which illustrates the initial radio channel connection operation after the power supply is turned on. In response to a control signal from CPU 331, radio controller 336 in radio unit controller 330 controls synthesizer 320 to change the frequency of output therefrom. Thereby, a predetermined range of control channels (referred to as D channels hereinafter) are scanned in demodulator 312 to obtain the information indicative of electric field intensity of the received signals over each channel (step 901). The channel having the strongest electric field intensity is selected from the D channels and the apparatus is ready for receiving signals through the D channel having the strongest electric field intensity. In this case, information of a channel having the second strongest intensity is also obtained.

Under the control of CPU 331, audio circuit controller 339 controls audio circuit 337 so that the output of demodulator 312 is applied to the input of control signal processor 338 and the output of control signal processor 338 is applied to the input of modulator 314.

Control signal processor 338 performs bit and frame synchronization operations on signals received through the selected D channel (step 903). Thereby, a communication link is established between the mobile telephone and a base station. System information is then detected from signals received through this D channel by control signal processor 338 (step 905) and sent to CPU 331. The system information includes a system identification number (referred to as SID hereinafter) and a range of frequency channels (referred to as P channels hereinafter) to be scanned next. The received SID represents an MTSO covering the area where the mobile telephone is located. CPU 331 stores the SID in a SID register of RAM 335.

If the word synchronization or system information reception is not performed within a predetermined period of time, the D channel having the second strongest intensity is used to repeat the above operation (step 907). In this case, if word synchronization or system information reception is again not performed within the predetermined period of time, the demodulator scans the D channels again (step 901).

Figure 9:
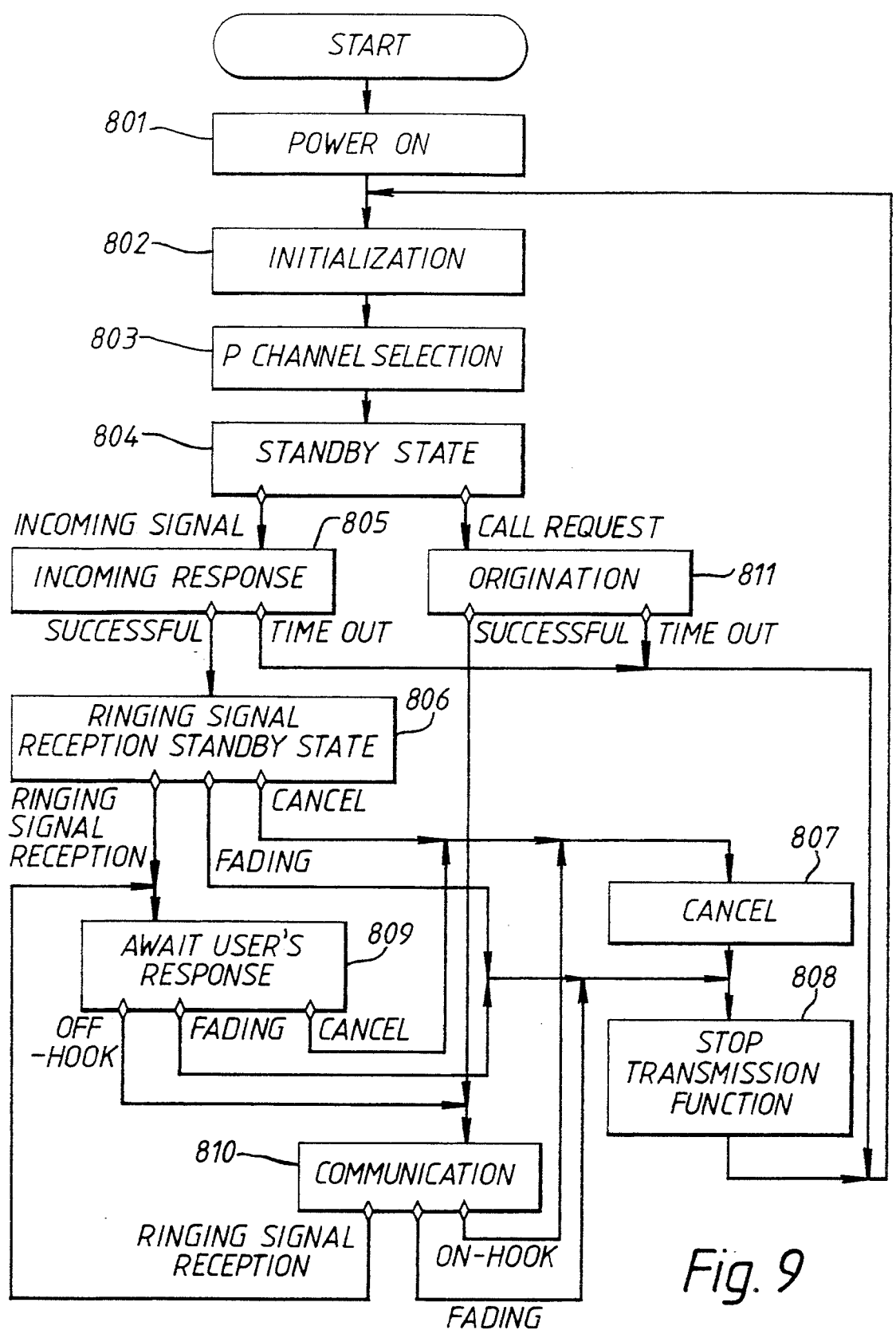
FIG. 9 is a flow chart illustrating a connection control operation sequence in the cellular telephone system of the present invention.
Figure 10:
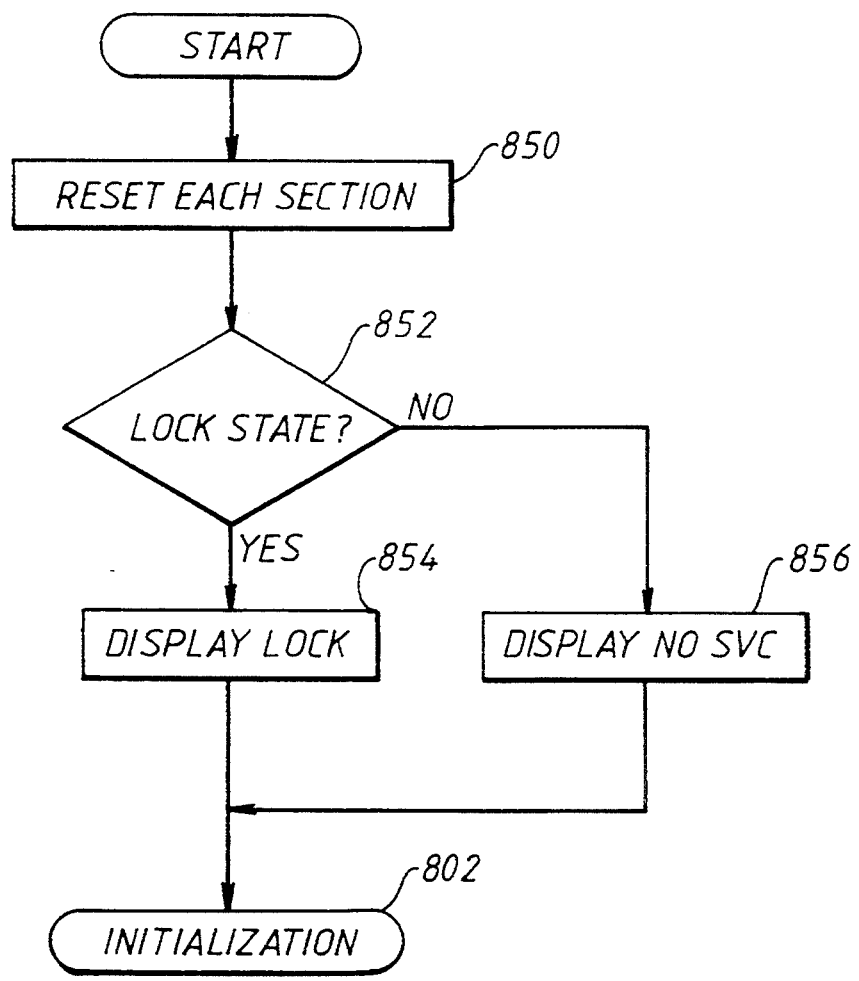
FIG. 10 is a flow chart illustrating a reset operation step in the connection control operation of FIG. 9.

When the above initialization operations are completed, scanning similar to the above scanning operation is performed for the P channels for receiving an incoming signal (step 803 in FIG. 9).

Figure 12:
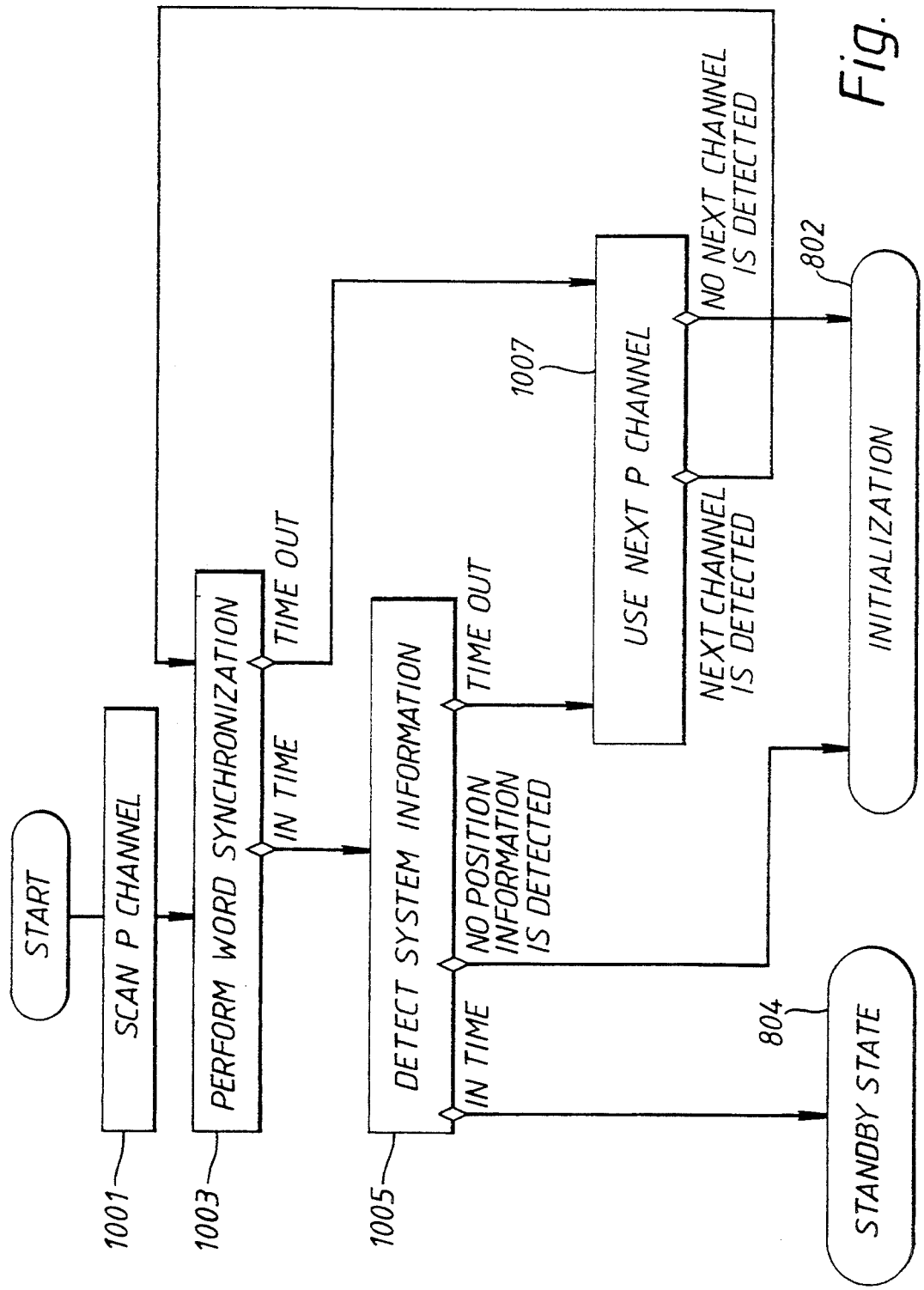
FIG. 12 is a flow chart illustrating an operation after the initialization operation in the connection control operation of FIG. 9.

FIG. 12 is a detailed flow chart which illustrates the P channel connection after initialization. Responsive to a control signal from CPU 331, radio controller 336 controls synthesizer 320 to change the frequency of the output therefrom so that P channels are scanned in demodulator 312 (step 1001) to obtain the information indicative of the electric field intensity of the received signals. The apparatus is ready for receiving information through the P channel having the strongest electric field intensity. In this case, information indicative of the P channel having the second strongest intensity is also obtained.

Control signal processor 338 performs bit and frame synchronization operations on signals received through the P channel which has the strongest electric field intensity (step 1003). After acquiring synchronization, control signal processor 338 obtains system information, including a SID representing an MTSO for serving the mobile telephone, from the following information signals (step 1005) and sends it to CPU 331.

If the word synchronization or system information reception is not performed within a predetermined period of time, an operation similar to the one described above is performed for the P channel having the second strongest intensity (step 1007). In this case, when word synchronization or system information reception is again not performed within the predetermined period of time, initialization is resumed (step 802 of FIG. 9). If position information is not obtained from system information, initialization is also resumed (step 802 of FIG. 9). The above connection control operations set the apparatus to the receive standby mode (step 804 of FIG. 9).

Figure 13:
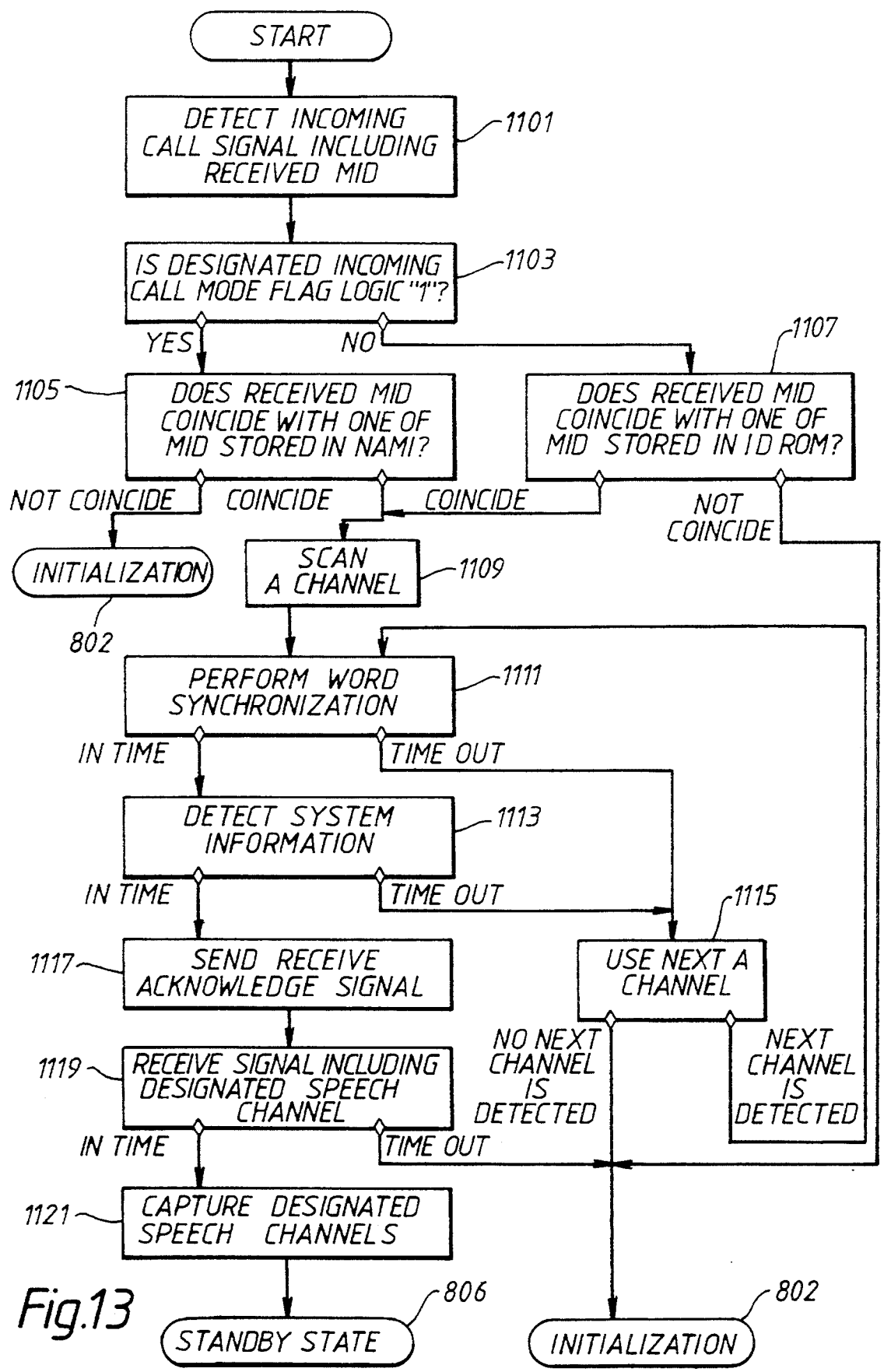
FIG. 13 is a flow chart illustrating an incoming call response operation in the connection control operation of FIG. 9.

In the standby state in step 804 of FIG. 9, if the apparatus receives an incoming signal, an incoming response sequence is performed (step 805). The incoming response sequence is illustrated by FIG. 13.

CPU 331 detects an incoming call signal through the P channel (step 1101). The incoming call signal includes a MID. In this case, the designated incoming call mode flag is checked (step 1103). When the designated incoming call mode flag is logic "1", the received MID is compared with the MID stored in NAM1 (step 1105). If the received MID coincides with, i.e., matches, one of the MIDs stored in NAM1, the CPU 331 causes the demodulator to scan each predetermined control channel (defined as A channel) to obtain information indicative of the strongest electric field intensity (step 1109). In this case, information indicative of second strongest electric field intensity is also obtained. If the received MID does not coincide with any of the MIDs stored in NAM1, initialization is resumed (step 802 of FIG. 9). When the designated incoming call mode flag is logic "0", the received MID is compared with the MIDs stored in ID ROM 370 (step 1107). If the received MID coincides with one of the MIDs stored in ID ROM 370, scanning of A channel is performed (step 1109). In this case, if the received MID does not coincide with any one of the MIDs stored in ID ROM 370, initialization is resumed (step 802).

Next, a word synchronization is performed on signals received through the selected A channel (step 1111). If the word synchronization is performed within a predetermined period of time, system information is detected by signals received through this A channel (step 1113). If the word synchronization is not performed or the system information is not obtained within a predetermined period of time, the A channel having the second strongest intensity is used to repeat the above operation (step 1115). In this case, if word synchronization is again not performed or system reception is again not performed within a predetermined period of time, initialization is resumed (step 802 of FIG. 9).

After the system information is obtained, a receive acknowledge signal is sent through the selected A channel to the base station (step 1117). The receive acknowledge signal includes the matched MID and the serial number. When the base station receives the receive acknowledge signal, the base station compares the matched MID and the serial number with the registered MID and serial number as referred to FIG. 2. If they coincide with each other and, therefore, the matched MID corresponds to the registered serial number, the base station sends a signal including information indicative of designated speech channels.

If the signal is received during a predetermined period of time by the apparatus (step 119), A channels are switched to the designated speech channels which include a forward channel for transmitting audio signals to the base station and a backward channel for receiving audio signals from the calling apparatus (step 1121). Thereby, a communication link between a calling telephone apparatus is established. If the matched MID and the serial number do not coincide with the registered MID and serial number in the base station and, therefore, the matched MID does not correspond to the registered serial number, the base station does not send the signal including the information indicative of designated speech channels. If the CPU 331 does not detect a signal during a predetermined period of time (step 1119), initialization is resumed (step 802 of FIG. 9).

The apparatus is set to be in a standby state for receiving a ringing signal (step 806 in FIG. 9). When a ringing signal is received, the apparatus generates a ringing tone. In this state, the apparatus is set to be awaiting user's response (step 809).

When the user responds to the ringing tone by depressing the "SEND" key, handset controller 418 detects the key operation and sends a control signal of "SEND" key operation to CPU 331 via digital interface 340 by way of lines 502. Also in the event that the user takes handset 400b off-hook, information indicating the closed state of the hook switch in switch 470 (FIG. 3) is transmitted to CPU 331 via digital interface 340 by way of line 501. Responsive to the off-hook control signal or the information, CPU 331 sends a connection signal to audio circuit controller 339. Receiving the connection signal, audio circuit controller 339 controls audio circuit 337 so that demodulator 312 and modulator 314 are connected to one of audio input/output unit 490a and 490b by way of line 503. Accordingly, the user may communicate with the calling party by using hands-free microphone 494 and loudspeaker 492 or handset microphone 466 and handset receiver 498. When the electric field intensity of speech channels is less than a predetermined level because of fading during more than a predetermined period of time in the acknowledge signal sending state (step 1117), or the speech channel reception state (step 1119), or a communication enable state (step 1121), or user's response awaiting state (step 809 of FIG. 9), the transmission function is disabled (step 808 of FIG. 9). During communication, when the user places the handset on-hook, the communication through speech channels is ceased (step 807). Thereafter when the transmission function is disabled (step 808), initialization is resumed (step 802).

Figure 14A:
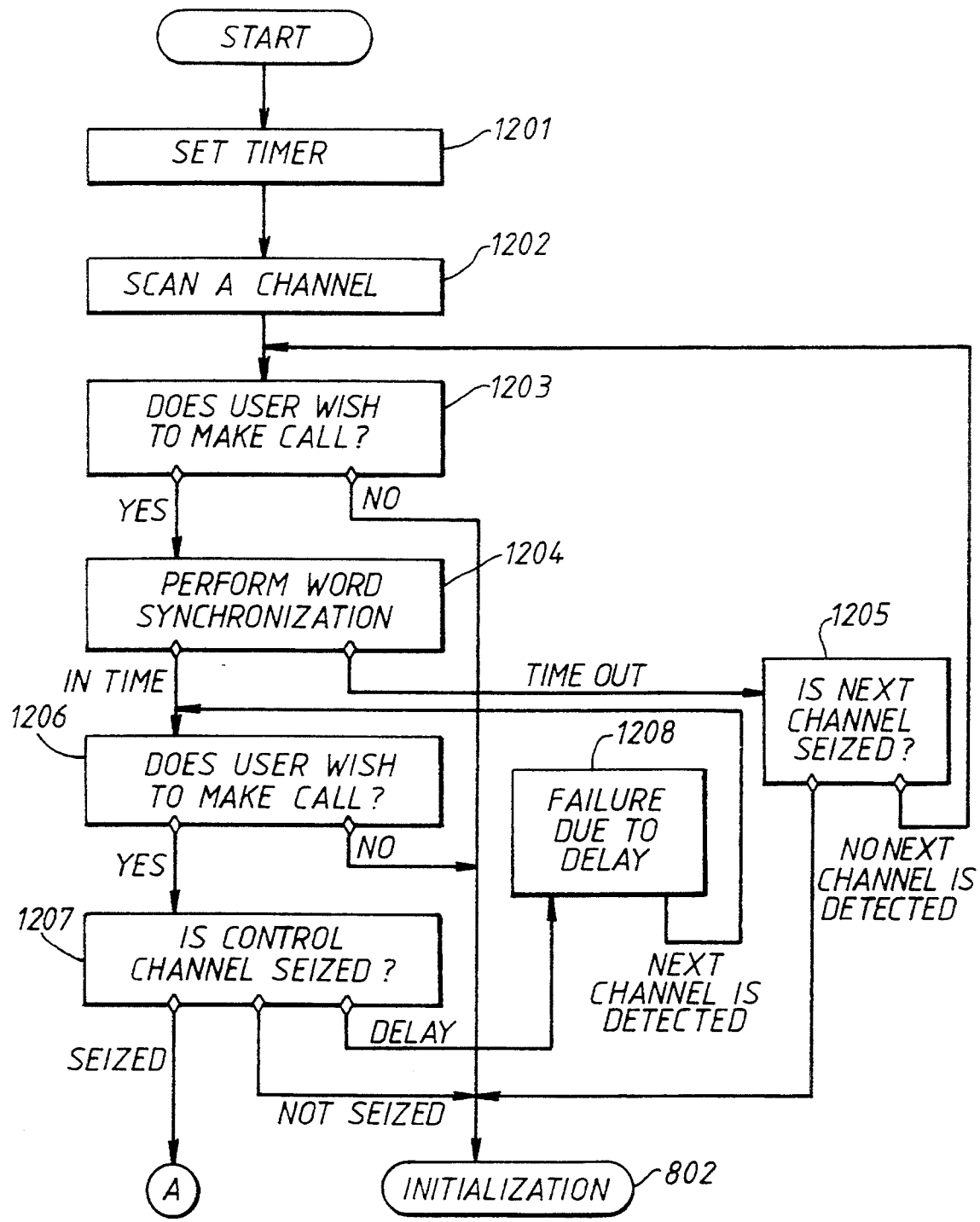
FIGS. 14(a), 14(b) show a flow chart illustrating a call origination operation in the connection control operation of FIG. 9.
Figure 14B:
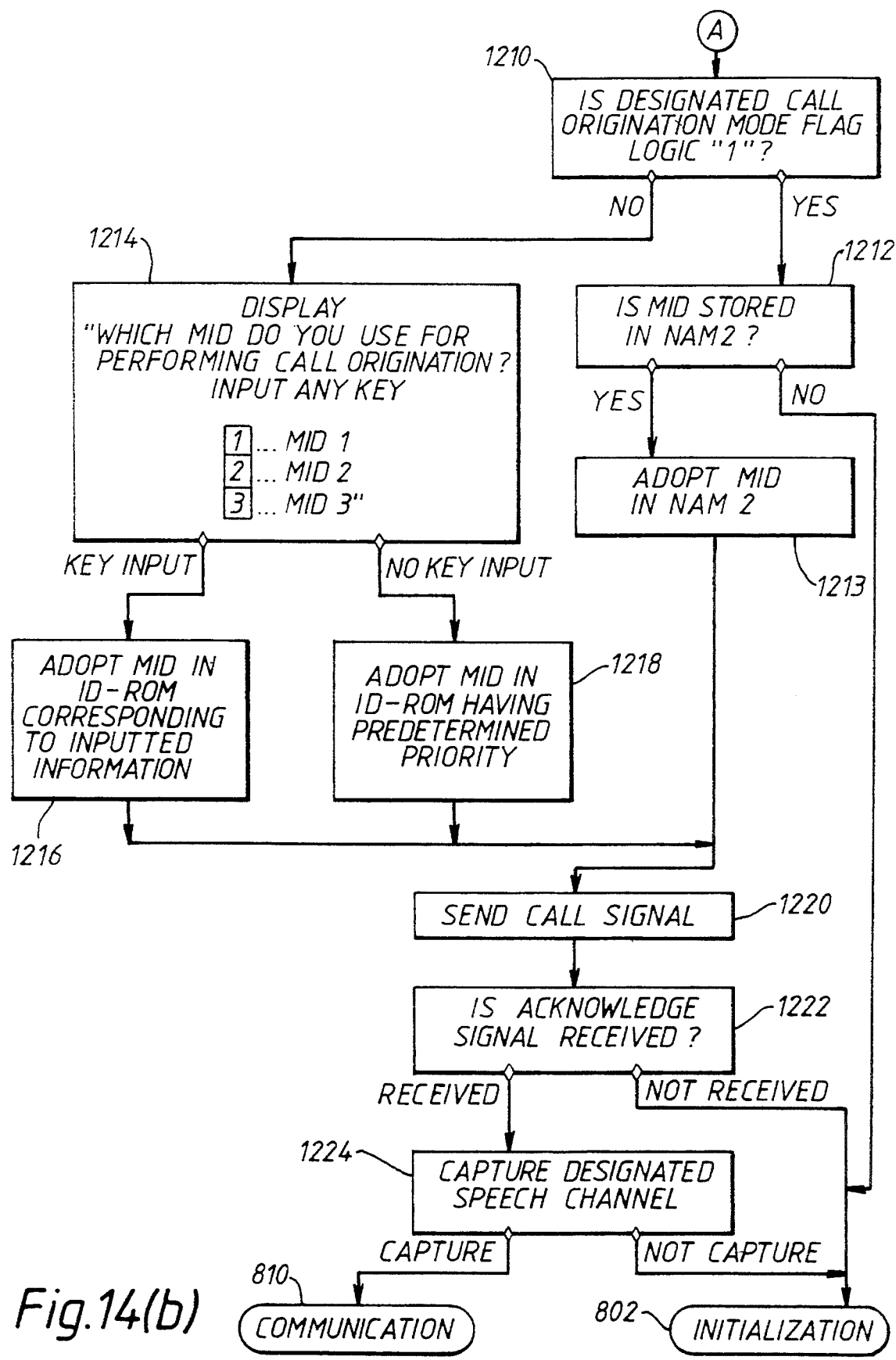

Next, a call origination processing sequence will be described. FIGS. 14(a), 14(b) show a detailed flow chart showing outgoing call processing. In the standby state in step 804 of FIG. 9, when a call request is detected by an input at the key unit 430, a timer for counting a call reception time is set (step 1201). The set time is, e.g., 12 seconds.

Thereafter, the audio controller in the radio unit causes the demodulator to scan each predetermined control channel (step 1202) to obtain reception electric field intensity information. The channel having the strongest electric field intensity is selected from these control channels and the apparatus is set to receive signals through the control channel having the strongest intensity. In this case, information indicative of the control channel having the second strongest electric field intensity is also obtained.

Next, the presence of the user wishing to make a call is checked (step 1203). This check is performed as follows. If the user enters a telephone number to be called on key pad 430 and depresses the "SEND" key, these key inputs are detected by handset controller 418. Handset controller 418 sends a detection signal to CPU 331 in radio unit controller 330. Responsive to the detection signal, a call flag in CPU 331 is set at a logic "1". In this case, the apparatus determines that the user wishes to make a call. However, if the user depresses the "END" key after depression of the "SEND" key, the call flag is reset at a logic "0". In this case, the apparatus determines that the user does not wish to make a call and initialization is resumed (step 802 of FIG. 9).

Control signal processor 338 performs bit and frame synchronization operations on the currently received control channel. That is, word synchronization thereof is performed to obtain system information from this control channel. However, if word synchronization cannot be performed, the same operation is performed using the control channel having the second strongest intensity (step 1205). In this case, if no word synchronization can be performed, initialization is resumed (step 802) of FIG. 9.

Next, the apparatus confirms again whether the user wishes to make a call (step 1206). As described above, if the call flag is set at logic "1", the apparatus determines that the user wishes to make a call. However, if the call flag is set at logic "0", the apparatus determines that the user does not wish to make a call and initialization is resumed (step 802 of FIG. 9).

CPU 331 confirms whether the selected control channel is appropriate for the origination signal to be broadcast by analyzing the system information signal from a base station. Upon the selection of an appropriate control channel (step 1207), a channel selection flag in CPU 331 is changed from logic "0" to "1". However, if any appropriate control channel is not selected, initialization is resumed (step 802 of FIG. 9) without changing the content of the channel selection flag. If the selection of an appropriate control channel is delayed (step 1208), the apparatus checks again whether the user wishes to make a call (step 1206).

In FIG. 14(b), when a designated call origination mode flag is set at a logic "1" (step 1210), the presence of a MID in NAM2 is checked (step 1212). When a MID is stored in NAM2, the MID in NAM2 is adopted (step 1213).

When the designated call origination mode flag is set at a logic "0" (step 1210). In order to urge the user to select one of MID 1-3 stored in ID ROM 370, a specific message may be displayed to the user (step 1214). The displayed message may be, for example, "Which MID do you use for performing call origination? Input any key. "1" ... MID1, "2" ... MID2, "3" ... MID3". If a key corresponding to one of the MIDs is operated, CPU 331 adopts the MID into ID ROM 370 corresponding to the key operation (step 1216). If no key operation is performed, CPU 331 adopts the MID stored in ID ROM 370 having a predetermined priority by checking a priority flag in ID ROM 370 (step 1218). As noted in FIG. 5, the priority flag of MID1 is set at a logic "1", therefore, MID1 is adopted. When a MID is not stored in NAM2 (step 1212), initialization is resumed (step 802 of FIG. 9).

After a MID is adopted, a call origination signal is sent through the control channel (step 1220). The call origination signal includes the adopted MID, the serial number, and an identification number of an apparatus to be called entered by the user.

When the base station receives the acknowledge signal, the base station compares the received MID and serial number with the registered MID and serial number. If they coincide with each other, the base station sends an acknowledge signal to the apparatus. If they do not coincide with each other, the base station does not send the acknowledge signal to the apparatus. Thereafter, the mobile telephone apparatus detects whether the acknowledge signal from the base station has been received (step 1222). The base station calls the other party to be called on the basis of the ID number included in the call origination signal. A communication link may then be established between the mobile telephone apparatus and the called telephone apparatus (step 1224). Otherwise, initialization is resumed (step 802 of FIG. 9). Thus, a communication link can be established as mentioned above (step 810 of FIG. 9), and thereafter the communication is closed. Key input in step 1216 may be replaced by a voice. The voice is detected by voice synthesizer 350 shown in FIG. 3.

Although the message for urging the user to select MID is displayed, the voice synthesizer 350 shown in FIG. 3 may generate a voice corresponding to the message.

As has been described in the incoming call reception sequence, when the received MID coincides with one of the MID stored in NAM1, the communication link is established. Therefore, the apparatus receives predetermined incoming call. The user is able to use the apparatus for public use in a case, for example during a weekday, for private use in another case, for example during a weekday, for private use in another case, for example during a holiday.

Further, in the call origination processing sequence when a MID is stored in NAM2, the communication link is established by way of the selected MID stored in NAM2. Therefore, the user is able to pay a user fee distinguishing first user fee for public use from a second user fee for private use.

Figures 15, 16:
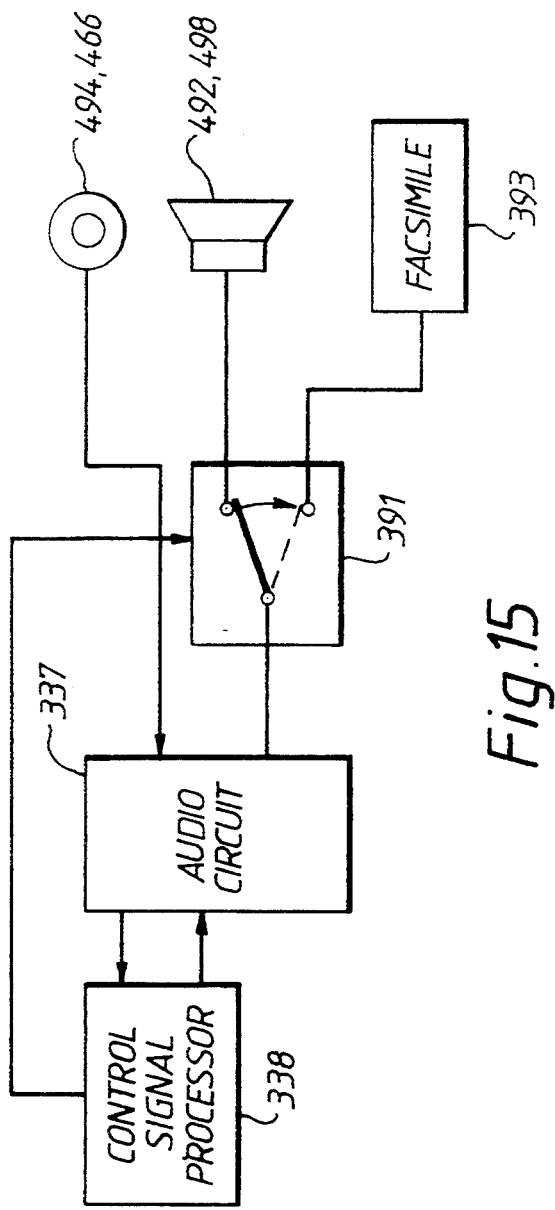
FIG. 15 is a block diagram illustrating an arrangement of a mobile telephone apparatus according to another embodiment of the present invention.
FIG. 16 is a chart illustrating the content of a RAM used in the embodiment illustrated in FIG. 15.

FIG. 15 is a flow chart showing another embodiment. Audio circuit 337 is connected to the microphones 494, 466 and a switch 391. The switch 391 is connected to the speakers 492, 498 and a facsimile 393. The facsimile 393 includes a CPU, a memory, a detecting portion for detecting a ringing signal, and a recording portion not shown. The switch 391 is controlled by the control signal processor 338.

FIG. 16 shows a diagram which illustrates the content of NAM1. Two MID1, 2, for example, may be stored with a serial number, e.g., SER NO. 100 at predetermined addresses FF00, FF01. MID1 is stored for a telephone ID number. MID2 is stored for a facsimile ID number. Therefore, the flag corresponding to MID1 is set at logic "0". The flag corresponding to MID 2 is set at logic "1".

Figure 17:
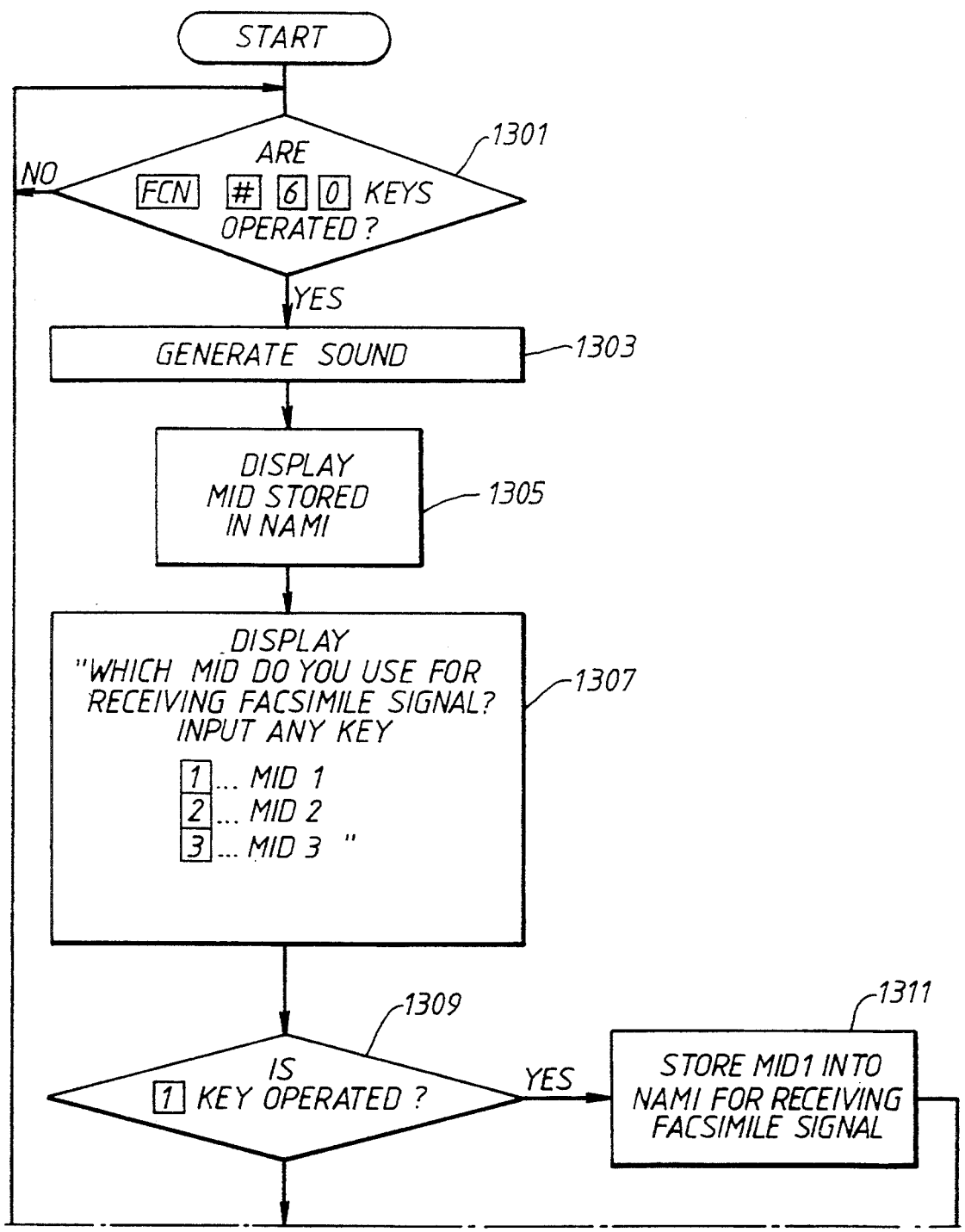
FIG. 17 is a flow chart illustrating a process for selecting a MID for receiving a facsimile signal from MIDs stored in ID ROM 370.
Figure 17:
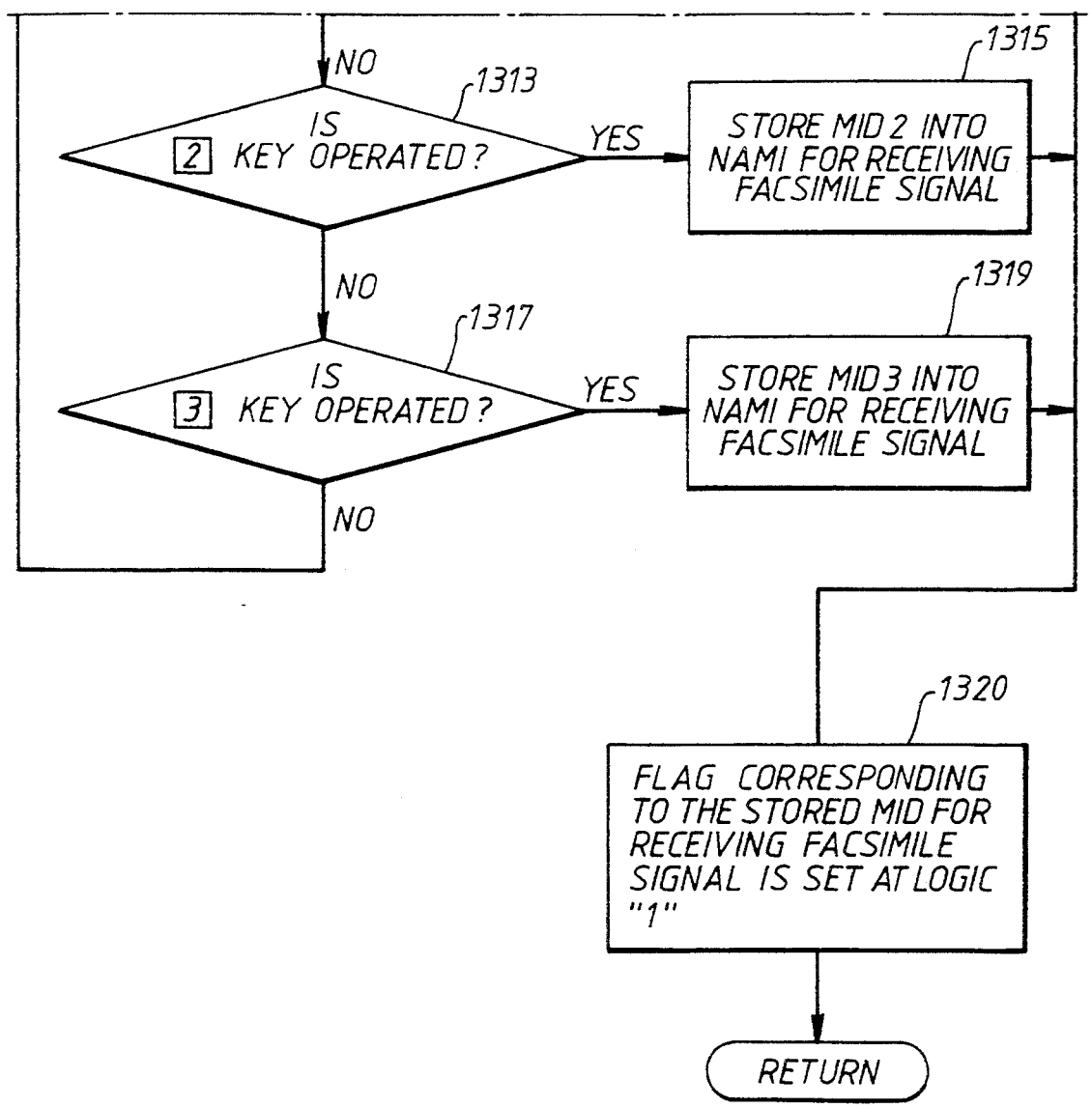

FIG. 17 is a flow chart which shows a process for storing at least one of MID1–3 for receiving a facsimile signal into NAM1. To determine if the user wishes to designate one MID for receiving a facsimile signal, for example, "FCN", "#", "6", "0" key operations are checked (step 1301). If these keys are operated, a beep sound is generated (step 1303). Thereafter, MID stored in NAM1 is displayed (step 1305). Thereafter, in order to urge the user to input an instruction necessary for selecting MID, a specific message may be displayed. The displayed message may be, for example, "Which MID do you use for receiving facsimile signal? Input any key. "I" ... MID1, "2" ... MID2, "3" ... MID3" (step 1307). After this operation, when "1" key is operated, MID1 is stored into NAM1 (step 1309, step 1311). When "2" key is operated, MID2 is stored into NAM1 (step 1313, step 1315). When "3" key is operated, MID3 is stored into NAM1 (step 1317, step 1319). If none of "1", "2", "3" keys are not operated, none of the MIDs is stored into NAM1. When any one of the MIDs is stored into NAM1, a flag corresponding to the stored MID for receiving a facsimile signal is set at logic "1" (step 1320). A flag corresponding to the stored MID for an incoming telephone call signal is set at logic "0". In FIG. 16, MID2 is the MID for receiving a facsimile signal, therefore the flag corresponding to MID2 is set at logic "1". On the other hand, MID1 is the MID for an incoming telephone call signal, therefore the flag corresponding to MIDI is set at logic "1". On the other hand, MID1 is the MID for an incoming telephone call signal, therefore the flag corresponding to MID1 is set at logic "0".

Figure 18A:
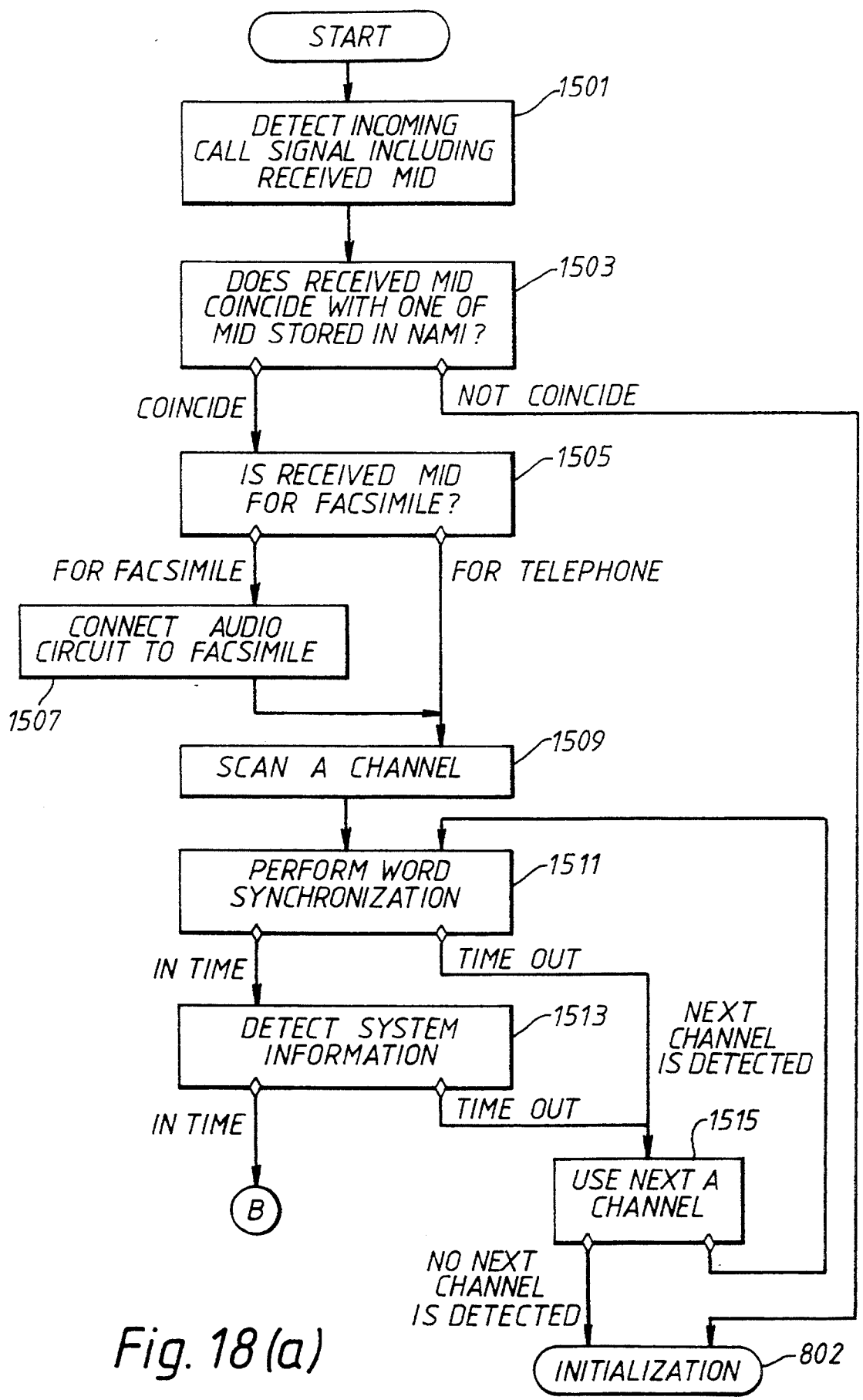
FIGS. 18(a), 18(b) show a flow chart illustrating an incoming call response operation of another embodiment.
Figure 18B:
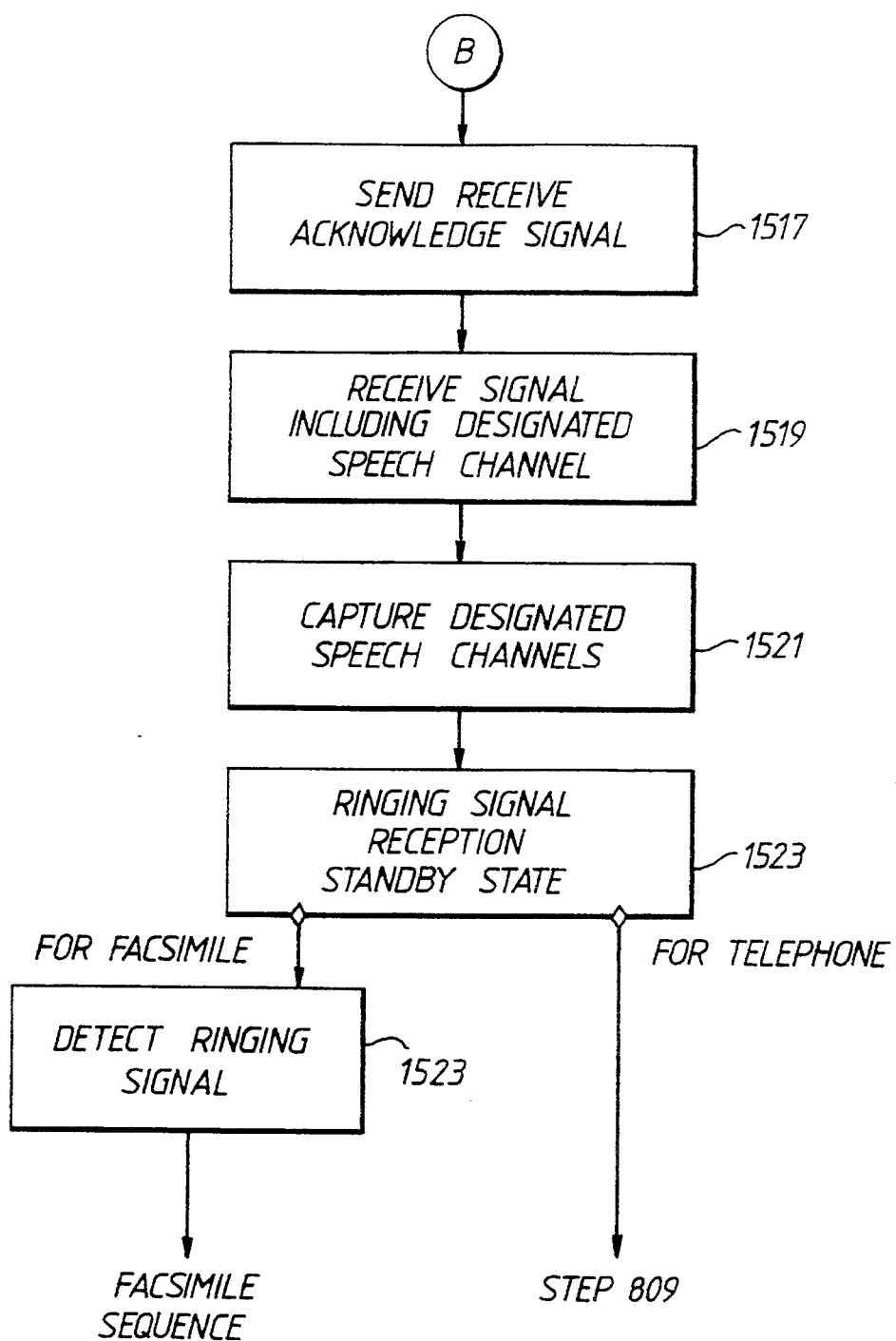

FIGS. 18(a), 18(b) show a flow chart showing a process for receiving a facsimile signal. The apparatus receives the incoming call signal (step 1501). If the received MID does not coincide with any one of the stored MIDs in NAM1, initialization is resumed (step 802 of FIG. 9). If the received MID coincides with one of the stored control MIDs in NAM1 (step 1503), the flag of NAM1 is checked (step 1505). If the flag corresponding to the matched MID in NAM1 is set at logic "1", the control signal processor provides a control signal with the switch 391. According to this signal, the audio circuit 337 is connected to the facsimile 393 (step 1507). Otherwise, the control signal processor does not provide a control signal with the switch 391.

Thereafter, a sequence from step 1509 to step 1521 similar to the described sequence from step 1109 to step 1121 in FIG. 13 is performed.

In the standby state (step 1523), when the received MID coincides with the designated MID for a telephone (step 1524), the described sequence from step 809 in FIG. 9 is performed. When the received MID coincides with the designated MID for a facsimile, the ringing signal is detected (step 1525) and a well-known facsimile sequence is performed. Therefore it is possible for the user to designate a MID for a facsimile number or a telephone number.

In this embodiment, the control signal processor determines whether the received MID coincides with the designated number for the facsimile or the telephone number. According to the result, the control signal processor connects audio circuit 337 to facsimile 393. On the other hand, a conventional apparatus does not have this feature. Therefore, in the conventional apparatus, after the user takes a handset off-hook when an incoming call for the facsimile is received the user listens to sound accompanied with a facsimile sequence. According to the sound, the user needs to operate a manual switch for connecting the audio circuit to the facsimile. In contrast, according to the above described embodiment, the user does not need to operate the switch for connecting the audio circuit to the facsimile. Further, if the user sets the facsimile so that the facsimile does not generate a ringing tone, the user does not need to take the handset off-hook when an incoming call for the facsimile is received. Therefore the user does not need to listen to a sound accompanied with the facsimile sequence.

In FIG. 15, a facsimile device may be provided as another terminal device. Although an embodiment applied to a mobile telephone apparatus has been described, it will now be apparent to those skilled in this art that this invention may be easily applied to any kind of radio telecommunication apparatus, for example, to a portable-type radio telephone. This invention also is applicable to a dual mode apparatus adopting one of the digital modulating system or the analog modulating system. Further, the concepts of the present invention may be applied to a data transmission apparatus used in a cellular radio telecommunication system.

We claim:

1. A radio telecommunication apparatus for use in a radio telecommunication system, wherein the radio telecommunication system encompasses a plurality of areas each having at least one base unit which broadcasts a broadcast mobile identification number over at least one radio channel within an area of the base unit, the radio telecommunication apparatus comprising:

storing means for storing a plurality of storage mobile identification numbers;

inputting means for inputting instruction information for selecting at least one of the storage mobile identification numbers, wherein each of said storage mobile identification numbers are individually selectable;

receiving means for receiving the broadcast mobile identification number broadcast by a base unit in whose area said radio telecommunication apparatus is present;

comparing means responsive to the receiving means and the inputting means for comparing the received mobile identification number with each selected mobile identification number if the instruction information is input and for comparing the received mobile identification number with each of the storage mobile identification numbers if the instruction information is not input; and establishing means responsive to the comparing means for establishing a communication link with the base unit that broadcast the received mobile identification number if the instruction information is input and the received mobile identification number coincides with a selected mobile identification number and for establishing the communication link with the base unit that broadcast the received mobile communication number if the instruction information is not input and the received mobile identification number coincides with one of the storage mobile identification numbers.

2. The radio telecommunication apparatus of claim 1, wherein the establishing means includes means for enabling access to a channel if the instruction information is input and the received mobile identification number coincides with a selected mobile identification number and means for enabling access to a channel if the instruction information is not input and the received mobile identification number coincides with one of the storage mobile identification numbers.

3. The radio telecommunication apparatus of claim 1, wherein a serial number for the radio telecommunication apparatus is stored in the storing means, and the establishing means further comprises sending means for sending the serial number and a mobile identification number which coincides with the received mobile identification number to the base unit that broadcast the received mobile identification number.

4. The radio telecommunication apparatus of claim 1, further comprising second storing means responsive to the inputting means for storing each selected mobile identification number.

5. The radio telecommunication apparatus of claim 1, wherein said inputting means comprises inputting means for inputting instruction information for selecting a plurality of storage mobile identification numbers.

6. The radio telecommunication apparatus of claim 5, further comprising second storing means for storing said selected mobile identification numbers.

7. A radio telecommunication apparatus for use in a radio telecommunication system, wherein the radio telecommunication system encompasses a plurality of areas each having at least one base unit which broadcasts a broadcast mobile identification number over at least one radio channel within the area of the base unit, the radio telecommunication apparatus comprising:

storing means for storing a plurality of storage mobile identification numbers;

inputting means for inputting instruction information for selecting at least one of the storage mobile identification numbers, wherein each of said storage mobile identification numbers are individually selectable;

receiving means for receiving the broadcast mobile identification number broadcast by a base unit in whose area said radio telecommunication apparatus is present;

comparing means responsive to the receiving means and the inputting means for comparing the received mobile identification number with each selected mobile identification number if the instruction information is input and for comparing the received mobile identification number with each of the storage identification numbers if the instruction information is not input; and disabling means responsive to the comparing means for disabling a communication link with the base unit that broadcast the received mobile identification number if the received mobile identification number does not coincide with any selected mobile identification number and the storage mobile identification numbers.

8. The radio telecommunication apparatus of claim 7, wherein said inputting means comprises inputting means for inputting instruction information for selecting a plurality of storage mobile identification numbers.

9. The radio telecommunication apparatus of claim 8, further comprising second storing means for storing said selected mobile identification numbers.

10. A radio telecommunication apparatus for use in a radio telecommunication system, wherein the radio telecommunication system encompasses a plurality of areas each having at least one base unit, the radio telecommunication apparatus comprising:

storing means for storing a plurality of mobile identification numbers, wherein a stored mobile identification number of the plurality of stored mobile identification numbers has a predetermined priority;

inputting means for inputting instruction information for selecting one of the stored mobile identification numbers and for inputting a call origination request and address information of a party to be called; and sending means responsive to the inputting means for sending to a base unit in whose area the radio communication apparatus is present the selected mobile identification number and the input address information if the instruction information is input and sending the stored mobile identification number having the predetermined priority if the instruction information is not input.

11. The radio telecommunication apparatus of claim 10, wherein a serial number for the radio telecommunication apparatus is stored in the storing means and wherein the sending means further sends the serial number with the selected mobile identification number and the input address information if the instruction information is input and sends the serial number with the stored mobile identification number having the predetermined priority and the input address information if the instruction information is not input.

12. The radio telecommunication apparatus of claim 10, further comprising informing means responsive to the inputting means for informing a user that the user should input the instruction information if the instruction information is not input.

13. The radio telecommunication apparatus of claim 12, wherein the informing means comprises displaying means for displaying a message informing the user to input the instruction information if the instruction information is not input.

14. The radio telecommunication apparatus of claim 12, wherein the informing means includes voice synthesis means for generating a voice communication informing the user to input the instruction information if the instruction information is not input.

15. A radio telecommunication apparatus for use in a radio telecommunication system, wherein the radio telecommunication system encompasses a plurality of areas each having at least one base unit, the radio telecommunication apparatus comprising:

storing means for storing a plurality of mobile identification numbers;

first inputting means for inputting instruction information for selecting one of the stored mobile identification numbers and for inputting a call origination request and address information of a party to be called;

informing means responsive to the first inputting means for informing a user that the user should input the instruction information if the instruction information is not input;

second inputting means for inputting the instruction information in response to the informing means, wherein the instruction information is input by the user; and sending means responsive to either the first or second inputting means for sending the selected mobile identification number and the input address information to a base unit in whose area the radio communication apparatus is present if the instruction information is input.

16. A radio telecommunication apparatus, connectable to a terminal device, for use in a radio telecommunication system, wherein the radio telecommunication system encompasses a plurality of areas each having at least one base unit which broadcasts a broadcast mobile identification number over at least one radio channel within the area of the base unit, the radio telecommunication apparatus comprising:

storing means for storing a plurality of mobile identification numbers;

inputting means for inputting instruction information from a user of the apparatus;

designating means, responsive to the instruction information, for designating any one mobile identification number stored in the storing means as a mobile identification number for audio communication and for designating another mobile identification number stored in the storing means as a mobile identification number for the terminal device, wherein each of said plurality of mobile identification numbers are individually designatable by said designating means;

receiving means for receiving the mobile identification number broadcast from a base unit in whose area the radio telecommunication apparatus is present;

comparing means responsive to the receiving means and the designating means for comparing the received mobile identification number with each of the designated mobile identification numbers; and coupling means responsive to the comparing means for coupling the receiving means to the terminal device if the received mobile identification number coincides with the designated mobile identification number for the terminal device.

17. The radio telecommunication apparatus of claim 16, wherein the terminal device is a facsimile device.

18. The apparatus according to claim 16, wherein said inputting means comprises inputting means for inputting instruction information that identifies said mobile identification number for the terminal device, wherein each of said mobile identification numbers stored in the storing means are individually identifiable.

19. A radio telecommunication apparatus for use in a radio telecommunication system, wherein the radio telecommunication system encompasses a plurality of areas each having at least one base unit which broadcasts a broadcast mobile identification number over at least one radio channel within the area of the base unit, the radio telecommunication apparatus comprising:

storing means for storing a plurality of storage mobile identification numbers;

inputting means for inputting instruction information for selecting among options of one or more than one of the storage mobile identification numbers, wherein each of said storage mobile identification numbers are individually selectable;

receiving means for receiving the mobile identification number broadcast from a base unit in whose area the radio telecommunication apparatus is present;

comparing means responsive to the receiving means and the inputting means for comparing the received mobile identification number with each selected mobile identification number; and establishing means responsive to the comparing means for establishing a communication link with the base unit that broadcast the received mobile identification number if the received mobile identification number coincides with a selected mobile identification number.

20. A method of enabling a radio telecommunication apparatus to be used in a radio telecommunication system, wherein the radio telecommunication system encompasses a plurality of areas each having at least one base unit which broadcasts a broadcast mobile identification number over at least one radio channel within the area of the base unit, the method comprising the steps of:

storing a plurality of storage mobile identification numbers;

inputting instruction information for selecting at least one of the storage mobile identification numbers, wherein each of said storage mobile identification numbers are individually selectable;

receiving the mobile identification number broadcast from a base unit in whose area the radio telecommunication apparatus is present;

comparing the received mobile identification number with each selected mobile identification number if the instruction information is input;

comparing the received mobile identification number with each of the storage identification numbers if the instruction information is not input;

establishing a communication link with the base unit that broadcast the received mobile identification number if the instruction information is input and the received mobile identification number coincides with a selected mobile identification number; and establishing the communication link with the base unit that broadcast the received mobile identification number if the instruction information is not input and the received mobile identification number coincides with one of the storage mobile identification numbers.

21. The method of claim 20, wherein said step of inputting further comprises inputting instruction information for selecting a plurality of storage mobile identification numbers.

22. The method of claim 21, wherein said step of storing comprises storing the plurality of storage mobile identification numbers in a first memory device, and further comprising the step of storing the selected mobile identification numbers in a second memory device.

23. A method of enabling a radio telecommunication apparatus to be used in a radio telecommunication system, wherein the radio telecommunication system encompasses a plurality of areas each having at least one base unit which broadcasts a broadcast mobile identification number over at least one radio channel within the area of the base unit, the method comprising the step of:

storing a plurality of storage mobile identification numbers;

inputting instruction information for selecting at least one of the storage mobile identification numbers, wherein each of said mobile identification numbers are individually selectable;

receiving a mobile identification number broadcast from a base unit in whose area the radio telecommunication apparatus is present;

comparing the received mobile identification number with each selected mobile identification number if the instruction information is input;

comparing the received mobile identification number with each of the storage identification numbers if the instruction information is not input; and disabling a communication link with the base unit that broadcast the received mobile identification number if the received mobile identification number does not coincide with any selected mobile identification number and the storage mobile identification numbers.

24. The method of claim 23, wherein the step of inputting further comprises the step of inputting instruction information for selecting a plurality of storage mobile identification numbers.

25. The method of claim 24, wherein said step of storing comprises storing the plurality of storage mobile identification numbers in a first memory device, and further comprising the step of storing the selected mobile identification numbers in a second memory device.

26. A method of enabling a radio telecommunication apparatus to be used in a radio telecommunication system, wherein the radio telecommunication system encompasses a plurality of areas each having at least one base unit, the method comprising the step of:

storing into storing means a plurality of mobile identification numbers, wherein a stored mobile identification number of the plurality of stored mobile identification number has a predetermined priority;

inputting instruction information for selecting one of the stored mobile identification numbers;

inputting a call origination request and address information of a party to be called;

sending the selected mobile identification number and the input address information to a base unit in whose area the radio telecommunication apparatus is present if the instruction information is input; and sending the mobile identification number having the predetermined priority to the base unit in whose area the radio telecommunication apparatus is present if the instruction information is not input.

27. A method of enabling a radio telecommunication apparatus to be used in a radio telecommunication system, wherein the radio telecommunication system encompasses a plurality of areas each having at least one base unit, the method comprising the step of:

storing into storing means a plurality of mobile identification numbers, wherein a stored mobile identification number of the plurality of stored mobile identification numbers has a predetermined priority;

inputting instruction information necessary for selecting one of the stored mobile identification numbers;

inputting a call origination request and address information of a party to be called;

informing a user that the user should input the instruction information if the instruction information is not input;

sending the selected mobile identification number and the input address information to a base unit in whose area the radio telecommunication apparatus is present if the instruction information is input; and sending the mobile identification number having the predetermined priority to a base unit in whose area the radio telecommunication apparatus is present if the instruction information is not input.

28. A method of enabling a radio telecommunication apparatus to be used in a radio telecommunication system, wherein the radio telecommunication system encompasses a plurality of areas each having at least one base unit, the method comprising the step of:

storing a plurality of mobile identification numbers;

inputting instruction information necessary for selecting one of the stored mobile identification numbers;

inputting a call origination request and address information of a party to be called;

informing a user that the user should input the instruction information if the instruction information is not input;

inputting the instruction information in response to the informing, wherein the instruction information is input by the user; and sending the selected mobile identification number and the input address information if the instruction information is input.

29. A method of enabling a radio telecommunication apparatus connectable to a terminal device, the radio telecommunication apparatus being used in a radio telecommunication system, wherein the radio telecommunication system encompasses a plurality of areas each having at least one base unit which broadcasts a broadcast mobile identification number over at least one radio channel within the area of the base unit, the method comprising the step of:

storing a plurality of storage mobile identification numbers in storing means;

inputting instruction information from a user of the radio telecommunication apparatus;

designating, in response to the instruction information, any one mobile identification number stored in the storing means as a mobile identification number for audio communication by a user and another mobile identification number stored in the storing means as a mobile identification number for the terminal device;

receiving with receiving means the mobile identification number broadcast from a base unit in whose area the radio communication apparatus is present;

comparing the received mobile identification number with each designated mobile identification number; and coupling the receiving means to the terminal device if the received mobile identification number coincides with the mobile identification number for the terminal device.

30. The method of claim 29, wherein each of said storage mobile identification numbers are individually designatable.

31. A method of enabling a radio telecommunication apparatus to be used in a radio telecommunication system, wherein the radio telecommunication system encompasses a plurality of areas each having at least one base unit which broadcasts a broadcast mobile identification number over at least one radio channel within the area of the base unit, the method comprising the step of:

storing a plurality of storage mobile identification numbers;

inputting instruction information necessary for selecting among options of one or more than one of the storage mobile identification numbers, wherein each of said storage mobile identification number are individually selectable;

receiving the mobile identification number broadcast from a base unit in whose area the radio communication apparatus is present;

comparing the received mobile identification number with each selected mobile identification number; and establishing a communication link with the base unit that broadcast the received mobile identification number if the received mobile identification number coincides with one of the selected mobile identification number.

* * * * *